(12) United States Patent
Ito et al.

(10) Patent No.: US 12,304,304 B2
(45) Date of Patent: May 20, 2025

(54) VEHICLE PEDAL MODULE

(71) Applicant: DENSO CORPORATION, Kariya (JP)

(72) Inventors: Kengo Ito, Kariya (JP); Daisuke Hokuto, Kariya (JP); Etsugo Yanagida, Kariya (JP); Masashi Arao, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/500,599

(22) Filed: Nov. 2, 2023

(65) Prior Publication Data

US 2024/0059143 A1 Feb. 22, 2024

Related U.S. Application Data

(63) Continuation of application No. PCT/JP2022/013794, filed on Mar. 24, 2022.

(30) Foreign Application Priority Data

May 14, 2021 (JP) ................. 2021-082796

(51) Int. Cl.
 *B60K 26/02* (2006.01)
 *B60T 7/06* (2006.01)
 (Continued)

(52) U.S. Cl.
 CPC ............... *B60K 26/02* (2013.01); *B60T 7/06* (2013.01); *G05G 1/36* (2013.01); *G05G 1/38* (2013.01); *G05G 5/03* (2013.01)

(58) Field of Classification Search
 CPC ............... G05G 1/36; B60K 2026/024; B60K 2026/026
 See application file for complete search history.

(56) References Cited

U.S. PATENT DOCUMENTS 5,063,811 A    11/1991  Smith et al.
11,021,058 B1 * 6/2021  Kim ..................... G05G 5/28
(Continued)

FOREIGN PATENT DOCUMENTS

JP    2015189371 A    11/2015
JP    2020149283 A     9/2020
WO   WO-2020180140 A1 *  9/2020

OTHER PUBLICATIONS

U.S. Appl. No. 18/501,607 to Masashi Arao, filed Nov. 2, 2023 (94 pages).

(Continued)

*Primary Examiner* — Daniel D Yabut
(74) *Attorney, Agent, or Firm* — Nixon & Vanderhye P.C.

(57) ABSTRACT

A vehicle pedal module includes a brake pedal device and an accelerator pedal device. The brake pedal device has a brake pedal first housing configured to rotatably support a brake pedal rotating shaft and to cover a brake-pedal reaction force generation mechanism, and a brake pedal second housing configured to support an end portion of the brake-pedal reaction force generation mechanism opposite to the brake pedal. The brake pedal second housing extends from the brake pedal device to the accelerator pedal device, to have at least a part of the accelerator pedal device fixed thereto, and to be installed on a vehicle body.

13 Claims, 13 Drawing Sheets

(51) Int. Cl.
*G05G 1/36* (2008.04)
*G05G 1/38* (2008.04)
*G05G 5/03* (2008.04)

(56) References Cited

U.S. PATENT DOCUMENTS

| | | | |
|---|---|---|---|
| 11,249,506 B1* | 2/2022 | Kim | B60T 7/06 |
| 11,312,236 B1* | 4/2022 | Kim | B60T 7/042 |
| 2002/0158453 A1* | 10/2002 | Levine | B60N 2/4279 |
| | | | 280/735 |
| 2003/0094070 A1* | 5/2003 | O'Neill | G05G 1/36 |
| | | | 74/560 |
| 2007/0138863 A1* | 6/2007 | Clark | G05G 5/18 |
| | | | 303/125 |
| 2008/0314192 A1* | 12/2008 | Willemsen | G05G 1/38 |
| | | | 74/512 |
| 2019/0163227 A1* | 5/2019 | Kadoi | G05G 5/05 |
| 2019/0310678 A1* | 10/2019 | Wojciechowski | B60K 26/021 |
| 2021/0300180 A1 | 9/2021 | Kihara et al. | |

OTHER PUBLICATIONS

U.S. Appl. No. 18/501,607 to Yasuhisa Fukuda et al., filed Nov. 2, 2023 (117 pages).
U.S. Appl. No. 18/501,607 to Daisuke Hokuto et al., filed Nov. 3, 2023 (75 pages).
U.S. Appl. No. 18/500,775 to Daisuke Hokuto, filed Nov. 2, 2023 (73 pages).
U.S. Appl. No. 18/500,573 to Yasuhisa Fukuda, filed Nov. 3, 2023 (58 pages).
U.S. Appl. No. 18/500,573 to Kengo Ito et al., filed Nov. 2, 2023 (51 pages).
U.S. Appl. No. 18/500,962 to Atsushi Nishimura et al., filed Nov. 2, 2023 (43 pages).

* cited by examiner

VEHICLE PEDAL MODULE

CROSS REFERENCE TO RELATED APPLICATION

The present application is a continuation application of International Patent Application No. PCT/JP2022/013794 filed on Mar. 24, 2022, which designated the U.S. and claims the benefit of priority from Japanese Patent Application No. 2021-082796, filed on May 14, 2021. The entire disclosures of all of the above applications are incorporated herein by reference.

TECHNICAL FIELD

The present disclosure relates to a vehicle pedal module that includes a plurality of by-wire pedal devices.

BACKGROUND

In a vehicle pedal module of a relevant art, a pendant-type brake pedal device and a pendant-type accelerator pedal device are fixed to a common bracket of a vehicle. The pendant type means that a portion of the pedal pad that is stepped on by a driver is arranged below a swing axis in a vertical direction when the pedal device is mounted on the vehicle.

SUMMARY

According to an aspect of the present disclosure, a pedal module for a vehicle, integrally provided with a plurality of by-wire pedal devices, includes a brake pedal device and an accelerator pedal device.

The brake pedal device includes a brake pedal configured to be stepped on by a foot of a driver and to swing about a first swing axis, a brake pedal rotating shaft provided at the first swing axis of the brake pedal, a brake pedal sensor configured to output a signal corresponding to a swing angle of the brake pedal, a brake-pedal reaction force generation mechanism configured to generate a reaction force against a stepping force of the driver applied to the brake pedal, a brake pedal first housing configured to rotatably support the brake pedal rotating shaft and to cover the brake-pedal reaction force generation mechanism, and a brake pedal second housing configured to support an end portion of the brake-pedal reaction force generation mechanism, opposite to the brake pedal, and provided at a position between the brake pedal first housing and a vehicle body.

The accelerator pedal device includes an accelerator pedal configured to be stepped on and operated by the foot of the driver to swing about a second swing axis, an accelerator pedal sensor configured to output a signal corresponding to the swing angle of the accelerator pedal, an accelerator-pedal reaction force generation mechanism configured to generate a reaction force against the stepping force of the driver applied to the accelerator pedal, and an accelerator pedal housing configured to cover the accelerator-pedal reaction force generation mechanism.

Furthermore, the brake pedal second housing may be installed on the vehicle body, to extend from the brake pedal device to the accelerator pedal device and to fix at least a part of the accelerator pedal device thereto.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
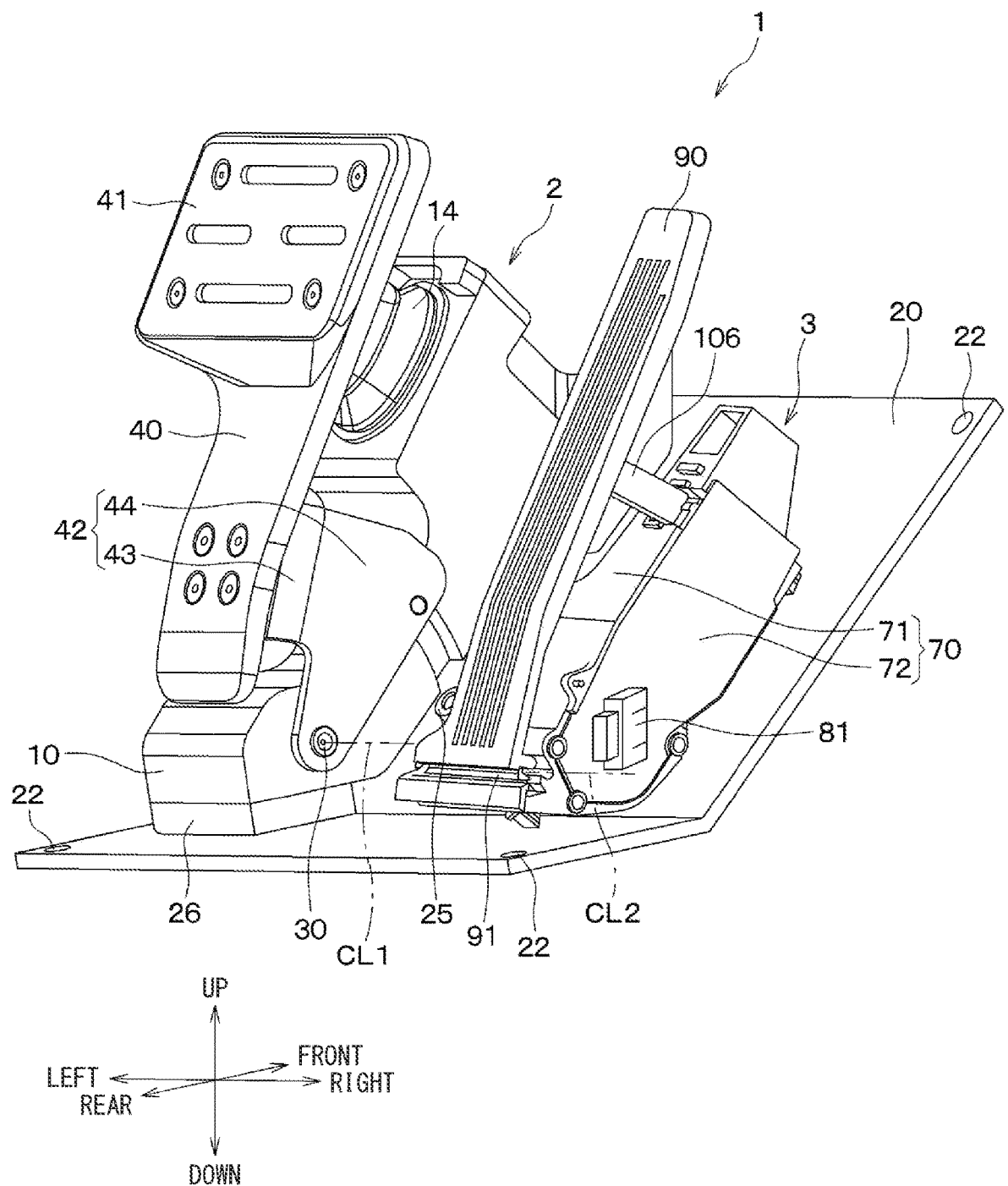
FIG. 1 is a perspective view of a vehicle pedal module according to a first embodiment.

For example, a brake pedal device provided in a vehicle pedal module includes a brake pedal that is stepped on and operated by a driver, and a brake pedal housing that supports the brake pedal in a swingable manner. On the other hand, an accelerator pedal device provided in the vehicle pedal module includes an accelerator pedal that is stepped on and operated by the driver, and an accelerator pedal housing that supports the accelerator pedal in a swingable manner. The brake pedal housing and the accelerator pedal housing may be fixed to a common bracket.

The brake pedal device of the vehicle pedal module may be used in a brake-by-wire system The applicant is developing the brake-by-wire system in which a master cylinder provided in a brake circuit of a vehicle and a brake pedal device are not mechanically connected. The brake pedal device used in the brake-by-wire system requires a reaction force generation mechanism for generating a reaction force against the driver's stepping force applied to the brake pedal. In addition, in the brake-by-wire system, a vehicle's electronic control unit controls the brake circuit based on a signal from a brake pedal sensor that detects a swing angle of the brake pedal, thereby requiring the signal output from the brake pedal sensor with a high reliability. For example, one end of a spring constituting the reaction force generation mechanism may be provided in the brake pedal housing and the other end thereof may be provided at the brake pedal. However, in such a configuration, when the driver applies a stepping force to the brake pedal, a high load is input from the reaction force generation mechanism to the brake pedal housing, which may deform the brake pedal housing. If the brake pedal housing is deformed, a swing of the brake pedal supported by the brake pedal housing will fluctuate, and thereby the reliability of the output signal from the brake pedal sensor may deteriorate.

It is an object of the present disclosure to provide a vehicle pedal module capable of improving the mountability of a brake pedal device and an accelerator pedal device to a vehicle, stabilizing the swing of the brake pedal, and improving reliability of an output signal of a brake pedal sensor.

According to an aspect of the present disclosure, a pedal module for a vehicle, integrally provided with a plurality of by-wire pedal devices, includes a brake pedal device and an accelerator pedal device.

The brake pedal device includes a brake pedal configured to be stepped on by a foot of a driver and to swing about a first swing axis, a brake pedal rotating shaft provided at the first swing axis of the brake pedal, a brake pedal sensor configured to output a signal corresponding to a swing angle of the brake pedal, a brake-pedal reaction force generation mechanism configured to generate a reaction force against a stepping force of the driver applied to the brake pedal, a brake pedal first housing configured to rotatably support the brake pedal rotating shaft and to cover the brake-pedal reaction force generation mechanism, and a brake pedal second housing configured to support an end portion of the brake-pedal reaction force generation mechanism, opposite to the brake pedal, and provided at a position between the brake pedal first housing and a vehicle body.

The accelerator pedal device includes an accelerator pedal configured to be stepped on and operated by the foot of the driver to swing about a second swing axis, an accelerator pedal sensor configured to output a signal corresponding to the swing angle of the accelerator pedal, an accelerator-pedal reaction force generation mechanism configured to generate a reaction force against the stepping force of the driver applied to the accelerator pedal, and an accelerator pedal housing configured to cover the accelerator-pedal reaction force generation mechanism.

Furthermore, the brake pedal second housing is installed on the vehicle body, to extend from the brake pedal device to the accelerator pedal device and to fix at least a part of the accelerator pedal device thereto.

According to the above, in the brake pedal device, the brake pedal first housing that supports the brake pedal rotating shaft and the brake pedal second housing that supports the brake-pedal reaction force generation mechanism are provided as separate parts. Therefore, it is possible to select a suitable material having a sufficient strength for the respective two housings. Specifically, when the driver applies a stepping force to the brake pedal, a high load is input from the brake pedal to the brake pedal second housing via the brake-pedal reaction force generation mechanism, which makes it preferable to select a material with a high rigidity. Even when a high load is applied to the second brake pedal housing, transmission of the high load from the second brake pedal housing to the first brake pedal housing is cut off, thereby the first brake pedal housing is less susceptible to the high load. Therefore, in the brake pedal device, the swing of the brake pedal is stabilized by the brake pedal first housing that supports the brake pedal rotating shaft. Thus, the vehicle pedal module has an improved reliability of the output signal of the brake pedal sensor included in the brake pedal device.

Further, in the vehicle pedal module, the brake pedal second housing of the brake pedal device extends toward the accelerator pedal device, and at least a part of the accelerator pedal device is fixed to the brake pedal second housing in configuration, thereby the positional relationship between the brake pedal and the accelerator pedal can be maintained during a mounting to the vehicle. Specifically, the vehicle pedal module can be mounted to the vehicle while maintaining the positional relationship in which the accelerator pedal is positioned farther from the occupant than the brake pedal, thereby making it possible to improve the mountability of the brake pedal device and the accelerator pedal device to the vehicle, and to enhance the safety of the vehicle.

Embodiments of the present disclosure will now be described with reference to the drawings. Parts that are identical or equivalent to each other in the following embodiments are assigned with the corresponding reference numerals and will not be repeatedly described.

First Embodiment

The first embodiment will be described with reference to FIGS. 1 to 8. As shown in FIG. 1, a vehicle pedal module 1 (hereinafter simply referred to as "pedal module 1") of the present embodiment integrally includes an organ-type brake pedal device 2 and an organ-type accelerator pedal device 3. An organ-type pedal device is the one in which a part of a pedal that is stepped on by a driver is arranged above a swing axis in the vertical direction when the pedal device is mounted on a vehicle. In the organ-type pedal device, the portion of the pedal that is in front of the vehicle relative to the swing axis swings toward a floor of the vehicle or toward a dash panel of the vehicle as the driver's stepping force applied to the pedal increases. In the following description, the floor of the vehicle and the dash panel of the vehicle may also be referred to as the "body." The three-dimensional coordinates shown in each drawing indicate the vertical (up-down) direction, the front-rear direction, and the left-right direction when the pedal module 1 is mounted on the vehicle.

Figure 2:
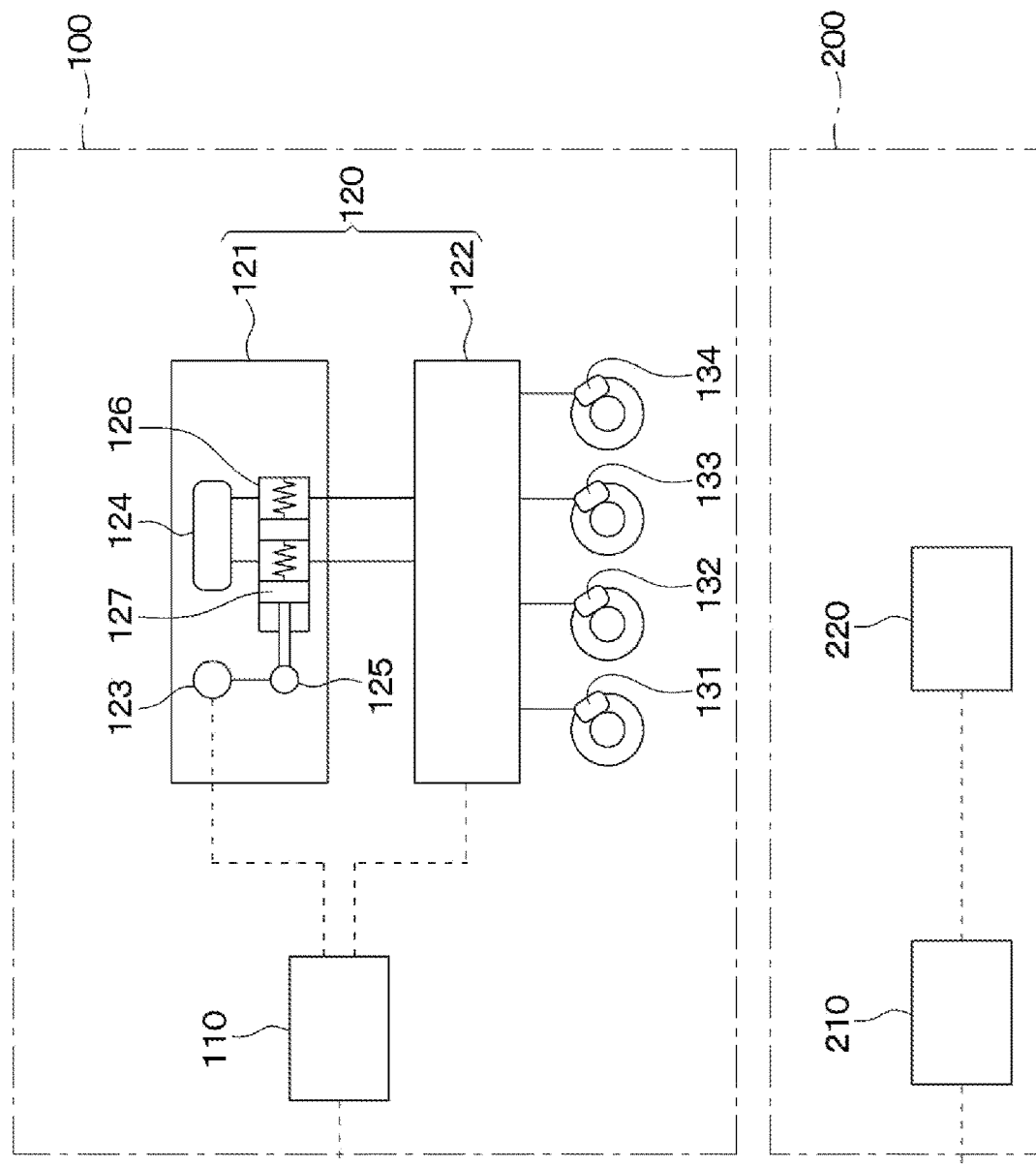
FIG. 2 is a schematic configuration diagram of a brake-by-wire system and an accelerator-by-wire system in which the vehicle pedal module is used.

As shown in FIG. 2, the brake pedal device 2 included in the pedal module 1 of the present embodiment is used for a brake-by-wire system 100, and the accelerator pedal device 3 is used for an accelerator-by-wire system 200.

First, the brake-by-wire system 100 using the brake pedal device 2 and the accelerator-by-wire system 200 using the accelerator pedal device 3 respectively provided in the pedal module 1 of the present embodiment will be described.

The brake-by-wire system 100 is a system in which a brake electronic control device 110 drives and controls a brake circuit 120 based on an electric signal output from a brake pedal sensor 50 of the brake pedal device 2. The brake circuit 120 generates hydraulic pressure required for braking the vehicle to drive wheel cylinders 131 to 134. The brake electronic control device 110 is hereinafter referred to as a brake ECU 110. ECU is an abbreviation for electronic control unit. In the present embodiment, the brake circuit 120 is configured by a first brake circuit 121 and a second brake circuit 122.

An electric signal output from the brake pedal sensor 50 of the brake pedal device 2 is transmitted to the brake ECU 110. The brake ECU 110 is mainly made of a microcomputer including a CPU, ROM, RAM, etc., and the CPU executes a computer program stored in a semiconductor memory such as ROM, RAM, etc., which is a non-transitory, substantive storage medium. That is, the brake ECU 110 performs various control processes according to the computer program. Specifically, the brake ECU 110 supplies electric power to a motor 123 of the first brake circuit 121 or the like, to drive and control the first brake circuit 121. Further, the brake ECU 110 also drives and controls an electromagnetic valve, a motor, or the like (not shown) in the second brake circuit 122.

The first brake circuit 121 has a reservoir 124, the motor 123, a gear mechanism 125, a master cylinder 126, or the like. The reservoir 124 stores brake fluid. The motor 123 drives the gear mechanism 125. The gear mechanism 125 reciprocates a master piston 127 of the master cylinder 126 in the axial direction of the master cylinder 126. Movement of the master piston 127 increases hydraulic pressure of the brake fluid supplied from the reservoir 124 to the master cylinder 126, and hydraulic pressure is supplied from the first brake circuit 121 to the second brake circuit 122.

The second brake circuit 122 is a circuit for performing normal control, ABS control, VSC control, etc. by controlling hydraulic pressure of each of wheel cylinders 131 to 134 according to a control signal from the brake ECU 110. ABS is an abbreviation of Anti-lock Braking System, and VSC is an abbreviation of Vehicle Stability Control. The wheel cylinders 131 to 134 arranged on each of the wheels drive brake pads provided on each wheel.

When the driver of the vehicle steps on the brake pedal 40 of the brake pedal device 2, a signal corresponding to a swing angle of the brake pedal 40 (that is, a stroke amount of the brake pedal) is output from the brake pedal sensor 50 to the brake ECU 110. The brake ECU 110 drives the motor 123 to decelerate the vehicle. In such manner, when a rotation speed of the motor 123 increases, the master cylinder 126 increases the pressure of the brake fluid supplied from the reservoir 124. The hydraulic pressure of the brake fluid is transmitted from the first brake circuit 121 to the second brake circuit 122.

Further, the brake ECU 110 also performs normal control, ABS control, VSC control, or the like. For example, the brake ECU 110 performs braking according to the operation of the brake pedal 40 by the driver in normal control. Specifically, in normal control, the brake ECU 110 controls the driving of solenoid valves of the second brake circuit 122, thereby supplying the hydraulic pressure from the first brake circuit 121 to each of the wheel cylinders 131 to 134 via the second brake circuit 122. Therefore, the brake pads driven by the wheel cylinders 131 to 134 come into frictional contact with the corresponding brake discs, braking the wheels, thereby decelerating the vehicle.

Also, for example, the brake ECU 110 calculates a slip ratio of each wheel based on the speed of each wheel of the vehicle and the vehicle speed, and performs ABS control based on the calculation result. In the ABS control, the hydraulic pressure supplied to each of the wheel cylinders 131 to 134 is adjusted to prevent each wheel from locking. Also, for example, the brake ECU 110 calculates a side slip state of the vehicle based on a yaw rate, a steering angle, acceleration, speed of each wheel, vehicle speed, or the like, and performs VSC control based on the calculation result. The VSC control selects a wheel to be controlled for stabilizing a turning of the vehicle, and increases the hydraulic pressure of one or more of the wheel cylinders 131 to 134 corresponding to the selected wheel(s), thereby suppressing a side slip of the vehicle. Thus, the travel of the vehicle is stabilized. In addition to the normal control, ABS control, and VSC control described above, the brake ECU 110 may perform collision avoidance control, regenerative cooperative control, or the like based on signals from other ECUs (not shown).

On the other hand, the accelerator-by-wire system 200 is a system in which an electronic throttle valve 220 is driven and controlled by an electronic accelerator controller 210 mounted on the vehicle based on an electric signal output from an accelerator pedal sensor 80 of the accelerator pedal device 3. The electronic throttle valve 220 controls an intake air amount of the engine. The accelerator electronic controller 210 is hereinafter referred to as an accelerator ECU 210.

An electric signal output from the accelerator pedal sensor 80 of the accelerator pedal device 3 is transmitted to the accelerator ECU 210. The accelerator ECU 210 is also mainly made of a microcomputer comprising a CPU, ROM, RAM, etc., and the CPU executes a computer program stored in a semiconductor memory such as ROM, RAM, etc., which is a non-transitory, substantive storage medium. That is, the accelerator ECU 210 performs various control processes according to the computer program. Specifically, the accelerator ECU 210 drives and controls the electronic throttle valve 220.

When the driver steps on an accelerator pedal 90 of the accelerator pedal device 3, the accelerator pedal sensor 80 outputs a signal corresponding to a swing angle of the accelerator pedal 90 (that is, an accelerator pedal stroke amount) to the accelerator ECU 210. The accelerator ECU 210 increases or decreases a valve opening degree of the electronic throttle valve 220 based on the accelerator pedal stroke amount. For example, the accelerator ECU 210 increases the valve opening degree of the electronic throttle valve 220 as the accelerator pedal stroke amount increases. The electronic throttle valve 220 is an electric valve device provided in an air intake system of the engine. As the valve opening degree of the electronic throttle valve 220 increases, the intake air amount of the engine increases.

Next, the brake pedal device 2 provided in the pedal module 1 will be described.

Figure 3:
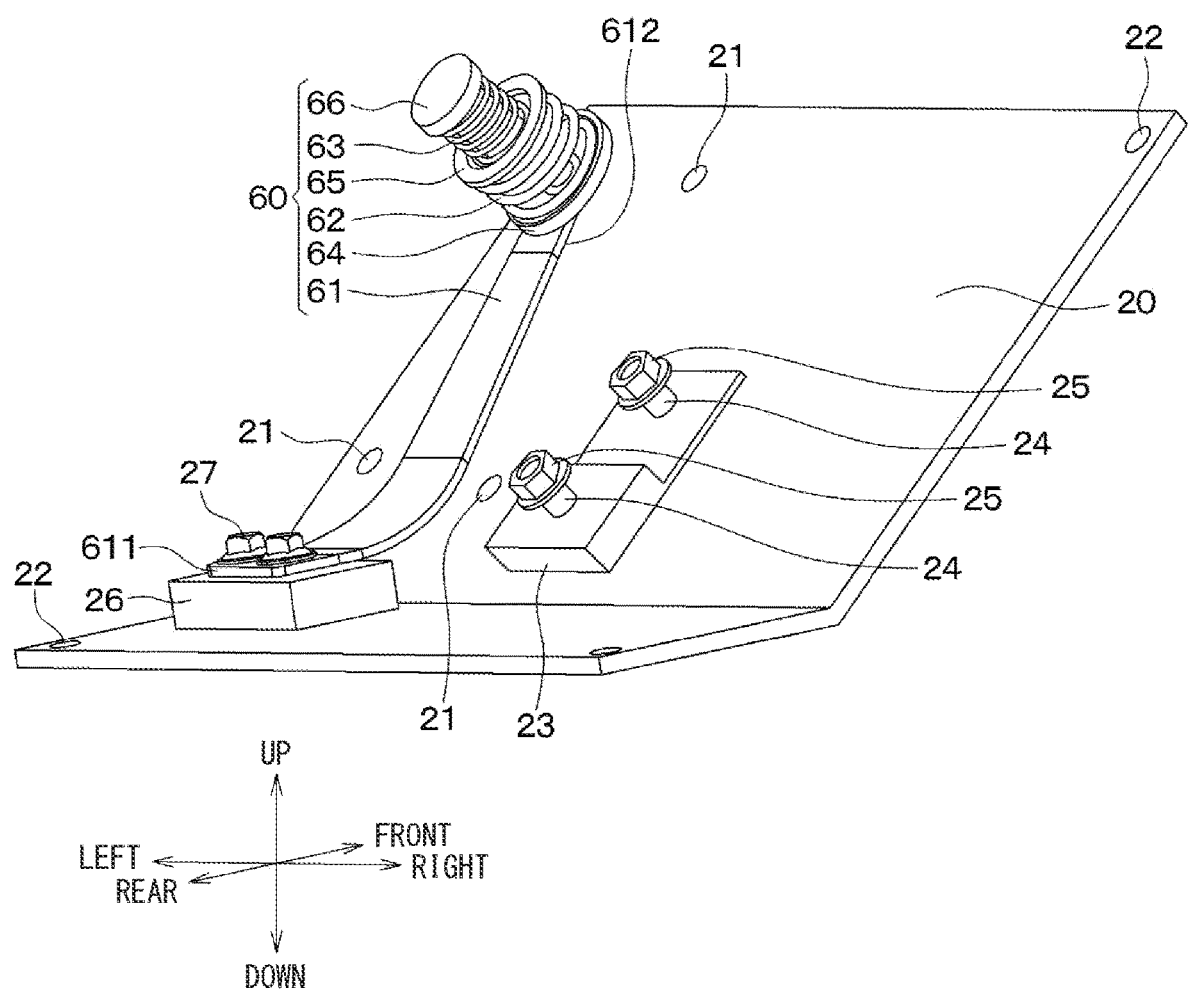
FIG. 3 is a perspective view of the vehicle pedal module shown in FIG. 1 in which a brake pedal, a first brake pedal housing, an accelerator pedal, an accelerator pedal housing, or the like are removed therefrom.
Figure 4:
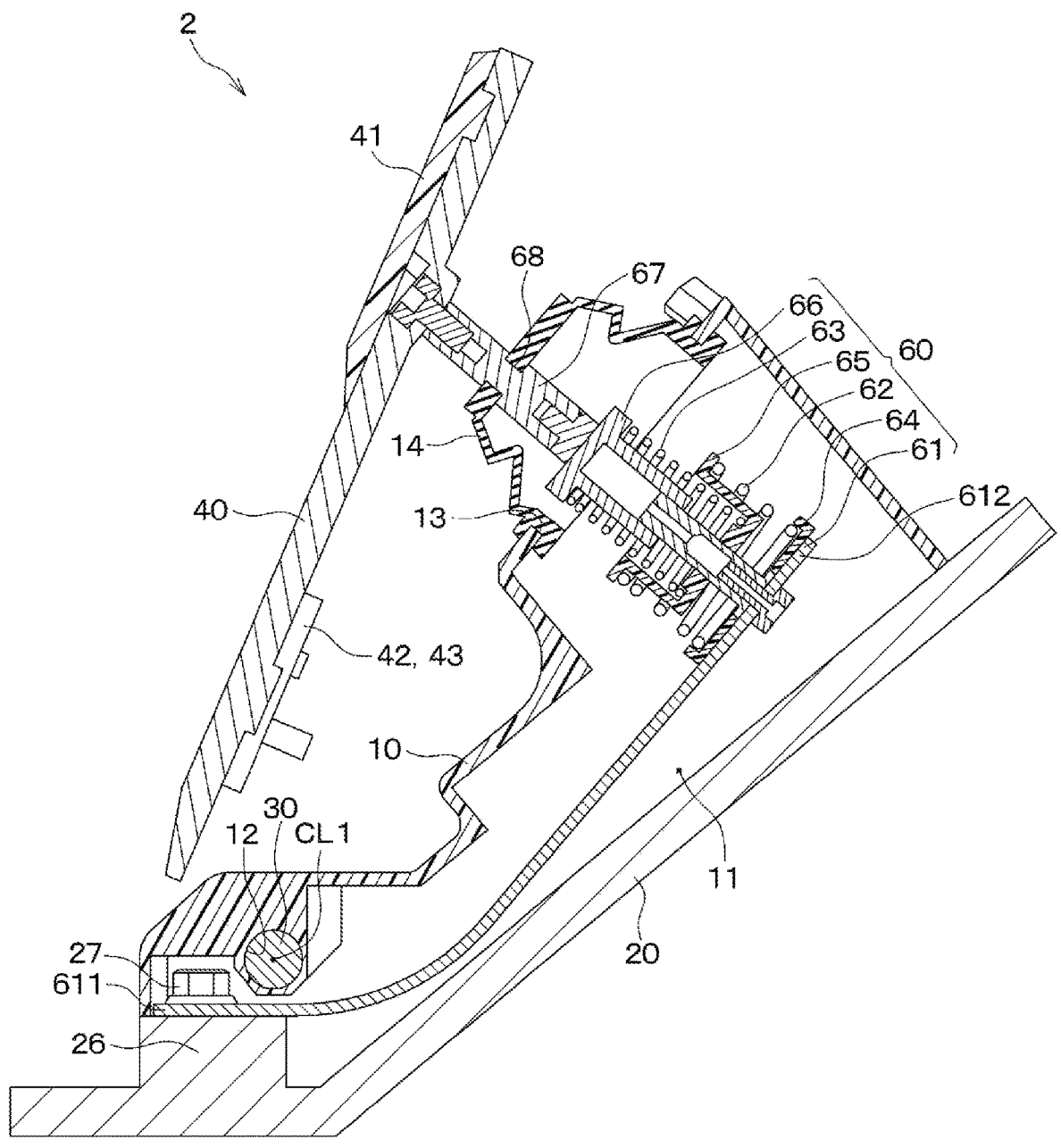
FIG. 4 is a cross-sectional view perpendicular to a swing axis of the brake pedal in a brake pedal device provided in the vehicle pedal module.
Figure 5:
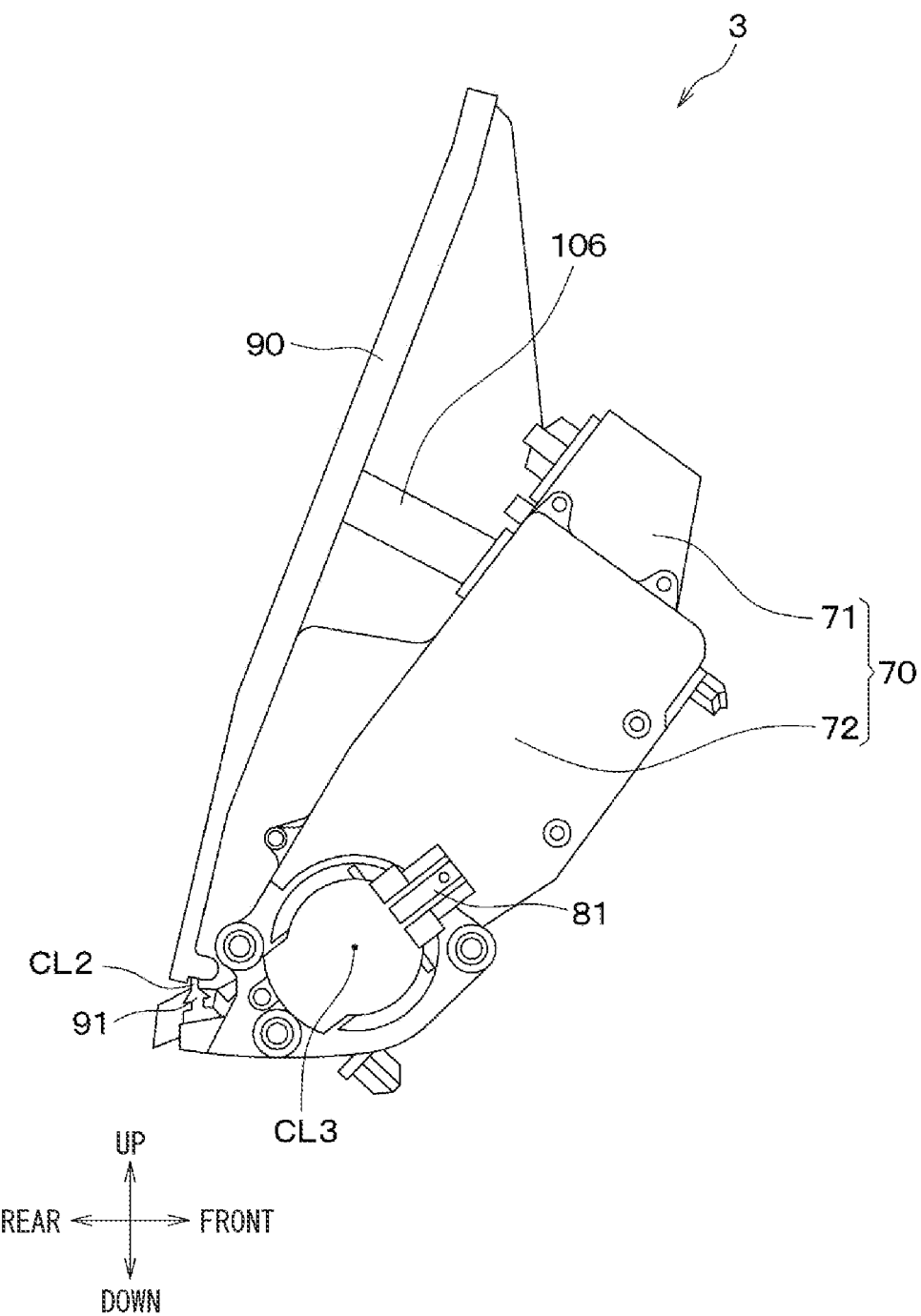
FIG. 5 is a side view of an accelerator pedal device provided in the vehicle pedal module.
Figure 6:
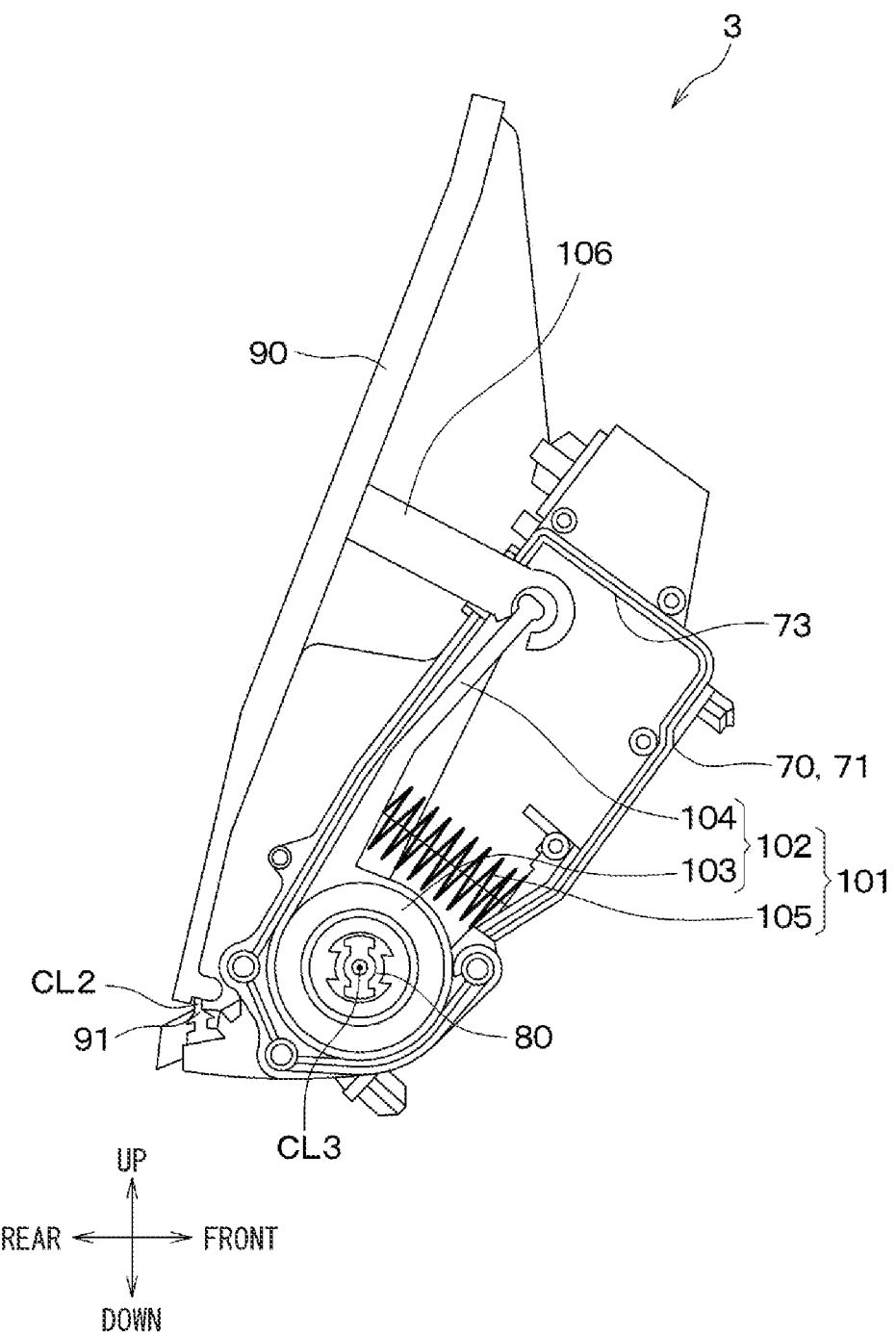
FIG. 6 is a side view showing a state in which a housing cover is removed in the accelerator pedal device provided in the vehicle pedal module.
Figure 7:
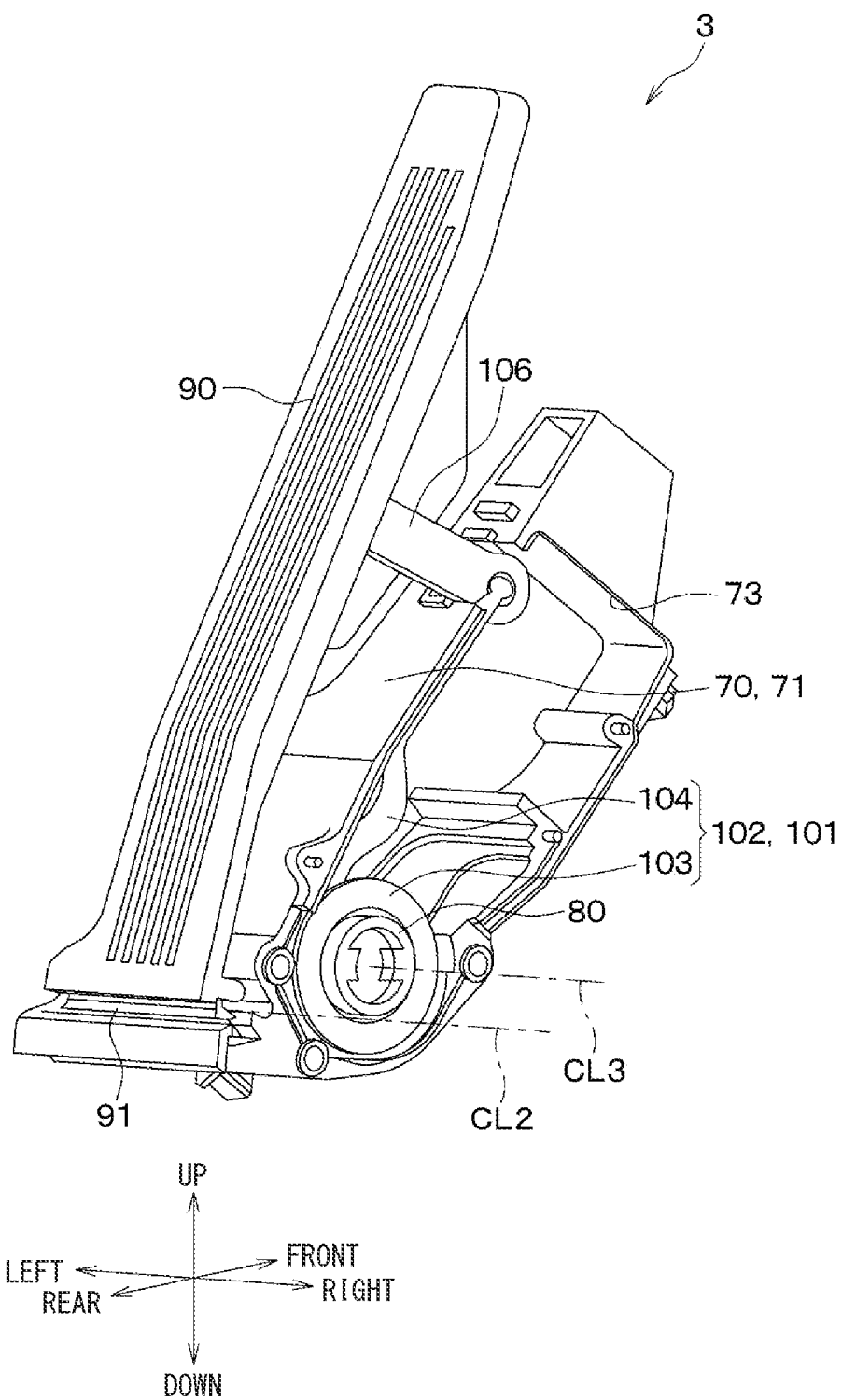
FIG. 7 is a perspective view showing a state in which the housing cover and a reaction force generation mechanism are removed in the accelerator pedal device provided in the vehicle pedal module.

As shown in FIGS. 1, 3 and 4, the brake pedal device 2 includes a brake pedal first housing 10, a brake pedal second housing 20, a brake pedal rotating shaft 30, the brake pedal 40, the brake pedal sensor 50, a brake-pedal reaction force generation mechanism 60 or the like. In the following description, the brake pedal first housing 10, the brake pedal second housing 20, the brake pedal rotating shaft 30, the brake pedal sensor 50, and the brake-pedal reaction force generation mechanism 60 are referred to as a B first housing 10 a B second housing 20, a B rotating shaft 30, a B sensor 50, and a B reaction force generation mechanism 60, respectively. Note that FIG. 3 mainly shows the B second housing 20 and the B reaction force generation mechanism 60 of the brake pedal device 2, and omits other configurations.

As shown in FIG. 4, the B first housing 10 is a member that rotatably supports the B rotating shaft 30 of the brake pedal 40, and covers the B reaction force generation mechanism 60. The B first housing 10 of the present embodiment is made of resin, for example, and is shaped like a box. A space for arranging the B sensor 50 and the B reaction force generation mechanism 60 is provided inside the B first housing 10 of the present embodiment.

The B first housing 10 has an opening 11 into which the B reaction force generation mechanism 60 can be inserted in at least one direction. Specifically, the B first housing 10 of the present embodiment has the largest opening 11 on one side facing the vehicle body where the pedal module 1 is installed (that is, on a B second housing 20 facing side). The largest opening 11 of the B first housing 10 has a size that allows an elastic member of the B reaction force generation mechanism 60 to be inserted without bending in a manufacturing process of the brake pedal device 2. The largest opening 11 of the B first housing 10 is closed by the B second housing 20. Thus, the B first housing 10 covers the B reaction force generation mechanism 60 together with the B second housing 20.

In addition, the B first housing 10 of the present embodiment has a cylindrical bearing portion 12 that rotatably supports the B rotating shaft 30 provided on a swing axis CL1 of the brake pedal 40. The B rotating shaft 30 of the brake pedal 40 is a columnar shaft rotatably provided in the bearing portion 12. Thus, the B first housing 10 rotatably supports the B rotating shaft 30 of the brake pedal 40.

As shown in FIG. 2, the B sensor 50 that detects a rotation angle of the B rotating shaft 30 is provided on or around the axis CL1 of the B rotating shaft 30 of the brake pedal 40. As the B sensor 50, it is possible to adopt a non-contact sensor circuit using a Hall IC or a magnetoresistive element, a contact sensor circuit, or the like, for example. The B sensor 50 is provided on the axis CL1 of the B rotating shaft 30 or around the axis CL1, thereby enabled to directly detect the rotation angle of the B rotating shaft 30. The rotation angle of the B rotating shaft 30 and the swing angle of the brake pedal 40 are the corresponding. The B sensor 50 outputs a signal corresponding to the rotation angle of the B rotating shaft 30 (that is, the swing angle of the brake pedal 40) from a connector (not shown) provided outside the B first housing 10 to the brake ECU 110 of the vehicle.

The B second housing 20 is provided on one side of the B first housing 10 in a direction along which the brake pedal 40 swings. The B second housing 20 extends continuously from a vehicle's front side portion of the B first housing 10 to a vehicle's rear side portion of the B first housing 10. The largest opening 11 of the B first housing 10 is closed by the B second housing 20.

As shown in FIG. 3, the B second housing 20 is provided with a first fastening hole 21 used for fixing to the B first housing 10 and a second fastening hole 22 used for fixing to the vehicle body. The method of fixing the B first housing 10 and the B second housing 20 is, for example, by passing a bolt (not shown) through the first fastening hole 21 provided in the B second housing 20 from a vehicle body side surface of the B second housing 20. Then, the bolt passed through the first fastening hole 21 is fastened to a threaded hole (not shown) provided in the B first housing 10.

Also, the B second housing 20 is installed on the vehicle body. The method of fixing the B first housing 10 to the vehicle body is, for example, by passing a bolt (not shown) through the second fastening holes 22 provided in the B second housing 20 from a surface of the B second housing 20 on a vehicle's interior side. Then, the bolt passed through the second fastening hole 22 is fastened to a screw hole provided on the vehicle body.

Further, the B second housing 20 extends from a brake pedal device 2 side to an accelerator pedal device 3 side, and at least a part of the accelerator pedal device 3 (an accelerator pedal housing 70 in the present embodiment) is fixed thereon. The fixing method of fixing the B second housing 20 and the accelerator pedal housing 70 is, for example, by inserting a bolt 24 protruding from a fixing base 23 provided in the B second housing 20 into a fastening hole (not shown) provided in the accelerator pedal housing 70. Then, the bolt 24 inserted into the fastening hole of the accelerator pedal housing 70 is fastened with a nut 25.

The B second housing 20 is made of a member having a higher Young's modulus (that is, a member having higher rigidity) than the B first housing 10. The B second housing 20 can be made of metal, for example. The B second housing 20 of the present embodiment can be manufactured by, for example, press working of a metal material, sheet metal working, cold forging, warm forging, or the like. In addition, the B second housing 20 may have a structure in which at least a part of the B second housing 20 includes a member having a Young's modulus larger than that of the B first housing 10 (that is, a member having high rigidity).

The B second housing 20 is provided with a support base 26 for supporting a portion of the B reaction force generation mechanism 60 on one side opposite to the brake pedal 40. The support base 26 is a portion protruding from the plate-like B second housing 20 in the plate thickness direction. In the present embodiment, one end 611 of a leaf spring 61 of the B reaction force generation mechanism 60 corresponds to a portion of the B reaction force generation mechanism 60 opposite to the brake pedal 40. Since the B second housing 20 of the present embodiment is made of a highly rigid member, even if a high load is input to the support base 26 from the one end 611 of the leaf spring 61 of the B reaction force generation mechanism 60, the amount of deformation of the B second housing 20 is small.

As shown in FIGS. 1 and 4, the brake pedal 40 is made of metal, resin, or the like in a plate shape, and is arranged obliquely with respect to the floor. Specifically, the brake pedal 40 is obliquely arranged so that its upper end is on the front side of the vehicle and its lower end is on the rear side of the vehicle. A thick portion 41 is provided at an upper portion of the brake pedal 40 as a portion to be stepped on by the driver. The thick portion 41 is arranged above the swing axis CL1 of the brake pedal 40 in the vertical direction when the brake pedal 40 is mounted on the vehicle. The brake pedal 40 is not limited to the arrangement shown in FIGS. 1 and 4, and may also be arranged substantially perpendicular to the floor, for example.

A connection plate 42 is provided on a back surface of the brake pedal 40. The connection plate 42 integrally includes a back plate portion 43 fixed to the back surface of the brake pedal 40 and a side plate portion 44 provided substantially perpendicular to the back plate portion 43. The side plate portion 44 of the connection plate 42 is fixed to the B rotating shaft 30. As described above, the B rotating shaft 30 is rotatably supported by the bearing portion 12 of the B first housing 10. Therefore, when the brake pedal 40 is stepped on by the driver's foot, the brake pedal 40 swings about the axis CL1 of the B rotating shaft 30 within a predetermined angular range in a forward rotation direction and a reverse rotation direction.

By configuring the connection plate 42 to have the back plate portion 43 and the side plate portion 44, the brake pedal 40 and the B rotating shaft 30 are arranged at positions separated from each other, and a space around the B rotating shaft 30 is usable for disposing the B sensor 50 with ease.

As shown in FIGS. 3 and 4, the B reaction force generation mechanism 60 is a mechanism that generates a reaction force against the driver's stepping force applied to the brake pedal 40. Since the brake pedal device 2 includes the B reaction force generation mechanism 60, even if the mechanical connection between the brake pedal 40 and the master cylinder 126 is eliminated, it is possible to obtain the corresponding reaction force as in a conventional brake system. Note that the conventional brake system refers to a configuration in which the brake pedal 40 and the master cylinder 126 are mechanically connected, and the brake pedal 40 receives a reaction force from the master cylinder 126 due to hydraulic pressure.

In the present embodiment, the B reaction force generation mechanism 60 has a plurality of elastic members. Specifically, the B reaction force generation mechanism 60 has the leaf spring 61, a large-diameter coil spring 62, and a small-diameter coil spring 63 as a plurality of elastic members. By configuring the B reaction force generation mechanism 60 to have a plurality of elastic members, the reaction force of the B reaction force generation mechanism 60 can be multi-staged with respect to changes in the swing angle of the brake pedal 40 (that is, the amount of brake pedal stroke). In such manner, the B reaction force generation mechanism 60 can reproduce the multistage reaction force characteristics that are unique to the conventional brake system.

The leaf spring 61 is curved to form a convex curved surface toward the floor when not receiving a load. The one end 611 of the leaf spring 61 (that is, a portion of the B reaction force generation mechanism 60 opposite to the brake pedal 40) is positioned between the B rotating shaft 30 of the brake pedal 40 and the support base 26 of the B second housing 20. The one end 611 of the leaf spring 61 is fixed to the support base 26 of the B second housing 20 with a bolt 27.

On the other hand, an other end 612 of the leaf spring 61 is provided with a lower holder 64, the large-diameter coil spring 62, a spring seat 65, the small-diameter coil spring 63, an upper holder 66, a connecting rod 67 or the like in this written order. The lower holder 64 is fixed to the other end 612 of the leaf spring 61. The large-diameter coil spring 62 has a leaf spring 61 side end supported by the lower holder 64, and a brake pedal 40 side end supported by the spring seat 65. The small-diameter coil spring 63 has a leaf spring 61 side end supported by the spring seat 65, and a brake pedal 40 side end supported by the upper holder 66. The connecting rod 67 has a brake pedal 40 side end fixed to the brake pedal 40, and a leaf spring 61 side end slidably contacting the upper holder 66. The connecting rod 67 may be configured such that the brake pedal 40 side end is connected to the brake pedal 40 in a swingable manner, and the leaf spring 61 side end is connected to the upper holder 66 in a swingable manner. The connecting rod 67 is inserted into an upper opening 13 provided in the B first housing 10. The upper opening 13 is sized to allow the small-diameter coil spring 63 and the upper holder 66 to pass therethrough.

With such configuration, when the driver applies a stepping force to the brake pedal 40 and the brake pedal 40 swings toward the B first housing 10 and the B second housing 20, a load is applied to each of the members in the B reaction force generation mechanism 60 from the brake pedal 40 via the connecting rod 67. Therefore, the leaf spring 61, the large-diameter coil spring 62, and the small-diameter coil spring 63, which constitute the B reaction force generation mechanism 60, bend according to their respective spring constants, and generate a reaction force against the stepping force applied to the brake pedal 40 by the driver. Specifically, when a load is applied to each of the members of the B reaction force generation mechanism 60 from the brake pedal 40 via the connecting rod 67, the large-diameter coil spring 62 and the small-diameter coil spring 63 bend in their spring axial directions. Further, the leaf spring 61 bends so that a portion on the other end 612 side where the lower holder 64 is fixed approaches the B second housing 20. The configurations of the B reaction force generation mechanism 60 and the connecting rod 67 are not limited to those illustrated above, and various configurations can be adopted.

A covering member 14 is provided around the connecting rod 67. The covering member 14 is made of rubber, for example, and is formed in a tubular and bellows shape. One end of the tube of the covering member 14 is fitted in a groove 68 provided in a middle of the connecting rod 67, and an other end of the tube of the covering member 14 is fitted to the upper opening 13 of the B first housing 10. The covering member 14 prevents foreign substances, water, or the like from entering the inside of the B first housing 10 from the upper opening 13 of the B first housing 10.

The brake pedal device 2 shown in FIGS. 1 to 4 is in a state where the driver's stepping force is not applied to the brake pedal 40 (that is, the brake pedal 40 is in its initial position). The initial position of the brake pedal 40 is regulated by a full-close stopper (not shown).

Although not shown, in the brake pedal device 2, when a driver's stepping force is applied to the brake pedal 40, the brake pedal 40 swings about the axis CL1 of the B rotating shaft 30. In such manner, the portion of the brake pedal 40 that is in an upper part of the vehicle with respect to the axis CL1 moves toward the floor or the dash panel. At this time, the B sensor 50 outputs a signal corresponding to the rotation angle of the B rotating shaft 30 (that is, the swing angle of the brake pedal 40) to the brake ECU 110 of the vehicle. The brake ECU 110 drives and controls the brake circuit 120 to generate hydraulic pressure required for braking the vehicle, and the hydraulic pressure drives the brake pads to decelerate or stop the vehicle.

Next, the accelerator pedal device 3 included in the pedal module 1 will be described.

As shown in FIGS. 1 and 5 to 7, the accelerator pedal device 3 has an accelerator pedal housing 70, an accelerator pedal sensor 80, an accelerator pedal 90, an accelerator-pedal reaction force generation mechanism 101, or the like. In the following description, the accelerator pedal housing 70, the accelerator pedal sensor 80, and the accelerator-pedal reaction force generation mechanism 101 are referred to as an A housing 70, an A sensor 80, and an A reaction force generation mechanism 101, respectively.

The A housing 70 is a member that supports the accelerator pedal 90 in a swingable manner, and covers the A sensor 80 and the A reaction force generation mechanism 101. The A housing 70 of the present embodiment has a housing body 71 and a housing cover 72. The housing body 71 is formed in a box shape and has an opening 73 on one side in an axis CL2 direction of swinging of the accelerator pedal 90. A space for arranging the A sensor 80 and the A reaction force generation mechanism 101 is provided inside the housing body 71. In the manufacturing process of the accelerator pedal device 3, the A sensor 80 and the A reaction force generation mechanism 101 can be inserted into the housing body 71 through the opening 73 of the housing body 71. The opening 73 of the housing body 71 is closed by a plate-shaped housing cover 72. Thus, the A housing 70 covers the A sensor 80 and the A reaction force generation mechanism 101.

Also, the A housing 70 and the accelerator pedal 90 of the present embodiment are connected by an integral hinge 91. The integral hinge 91 is made of resin, has one end connected to the A housing 70, the other end connected to the accelerator pedal 90, and has a thin portion in the middle. The accelerator pedal 90 swings about the thin portion of the integral hinge 91 as an axis CL2. That is, the integral hinge 91 is a member that functions as a rotating shaft of the accelerator pedal 90. Thus, the A housing 70 swingably supports the accelerator pedal 90 with the integral hinge 91.

The accelerator pedal 90 is formed in a plate shape from metal or resin, for example, and is arranged obliquely with respect to the floor. Specifically, the accelerator pedal 90 is obliquely arranged so that its upper end is on the front side of the vehicle and its lower end is on the rear side of the vehicle. The upper end of the accelerator pedal 90 is arranged above the swing axis CL2 of the accelerator pedal 90 in the vertical direction when the accelerator pedal 90 is mounted on the vehicle. The accelerator pedal 90 is not limited to the arrangement shown in FIGS. 1 and 5 to 7, and may also be arranged substantially perpendicular to the floor, for example. When the accelerator pedal 90 is stepped on by the driver's foot, the accelerator pedal 90 swings about the axis CL2 in the forward and reverse rotation directions within a predetermined angular range, with the thin portion of the integral hinge 91 serving as the axis CL2.

The A reaction force generation mechanism 101 is a mechanism that generates a reaction force against the driver's stepping force applied to the accelerator pedal 90 and is provided inside the A housing 70. The A reaction force generation mechanism 101 is made of an internal movable member 102 and a coil spring 105 as an elastic member.

The internal movable member 102 integrally has a rotor portion 103 and an arm portion 104. The rotor portion 103 is formed in a cylindrical shape and provided rotatably inside the A housing 70. The arm portion 104 extends from an outer circumference of the rotor portion 103 in its tangential direction. An end portion of the arm portion 104 opposite to the rotor portion 103 and the accelerator pedal 90 are connected via a connecting member 106. Therefore, when the accelerator pedal 90 swings about the integral hinge 91 as the axis CL2, such movement is transmitted to the internal movable member 102 via the connecting member 106. Therefore, the internal movable member 102 swings together with the accelerator pedal 90 about the center of the rotor portion 103 as an axis CL3.

The coil spring 105 as an elastic member constituting the A reaction force generation mechanism 101 has one end in the spring axial direction locked to an inner wall of the A housing 70 and an other end in the spring axial direction locked to the arm portion 104. Therefore, when the driver applies a stepping force to the accelerator pedal 90 and the accelerator pedal 90 swings toward an A housing 70 side and a B second housing 20 side, a load is applied from the accelerator pedal 90 to the coil spring 105 via the connecting member 106. Therefore, the coil spring 105 as an elastic member forming the A reaction force generation mechanism 101 bends in the spring axial direction and generates a reaction force against the force applied to the accelerator pedal 90 by the driver.

The A sensor 80 that detects a rotation angle of the rotor portion 103 is provided inside the rotor portion 103 of the internal movable member 102. As the A sensor 80, for example, it is possible to employ a non-contact sensor circuit using a Hall IC or a magnetoresistive element, a contact sensor circuit or the like. There is a correlation between the rotation angle of the rotor portion 103 and the swing angle of the accelerator pedal 90 (that is, the accelerator pedal stroke amount). The A sensor 80 outputs a signal corresponding to the rotation angle of the rotor portion 103 from a connector 81 provided outside the A housing 70 to the accelerator ECU 210 of the vehicle.

As shown in FIGS. 1 and 3, the B second housing 20 extends from a brake pedal device 2 side to an accelerator pedal device 3 side, and is configured to fix the A housing 70 of the accelerator pedal device 3. The fixing method of the B second housing 20 and the A housing 70 is, for example, by inserting the bolt 24 protruding from the fixing base 23 provided in the B second housing 20 into a fastening hole (not shown) provided in the A housing 70, and by fastening the nut 25 to the bolt 24.

The accelerator pedal device 3 shown in FIGS. 1 and 5 to 7 is in a state where the driver's stepping force is not applied to the accelerator pedal 90 (that is, the accelerator pedal 90 is in its initial position). Although not shown, in the accelerator pedal device 3, when a driver's stepping force is applied to the accelerator pedal 90, the accelerator pedal 90 swings about the thin portion of the integral hinge 91 serving as the axis CL2. In such manner, the portion of the accelerator pedal 90 that is in an upper part of the vehicle with respect to the axis CL2 moves toward the floor or the dash panel. At this time, the A sensor 80 outputs a signal corresponding to the rotation angle of the rotor portion 103 to the accelerator ECU 210 of the vehicle. The accelerator ECU 210 increases or decreases a valve opening degree of the electronic throttle valve 220 based on the accelerator pedal stroke amount.

Figure 8:
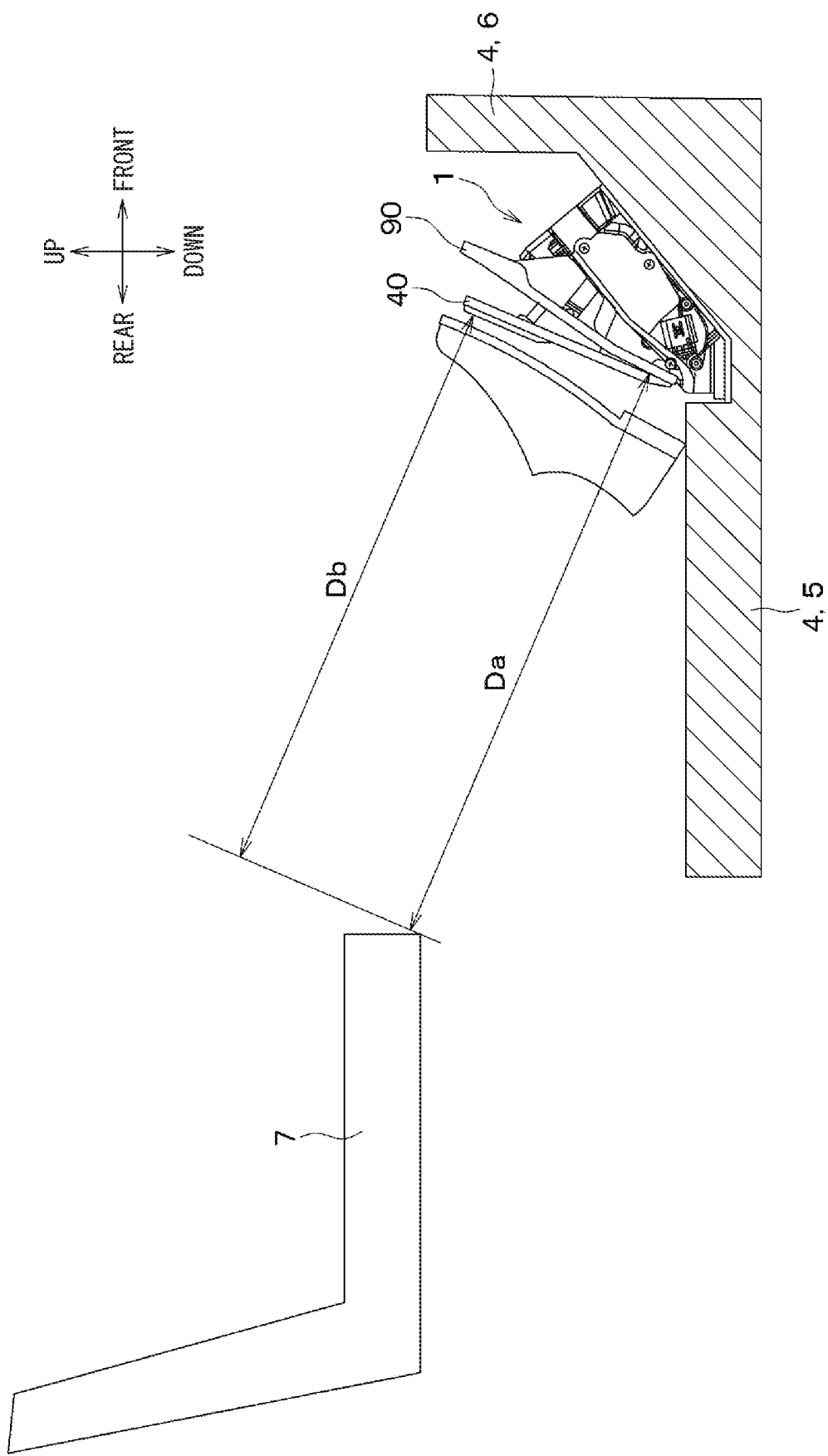
FIG. 8 is a diagram for explaining a positional relationship between the brake pedal device and the accelerator pedal device.

Here, FIG. 8 shows a state in which the pedal module 1 is mounted on the vehicle. FIG. 8 shows a state in which (a) the pedal module 1 is fixed to a vehicle body 4 and (b) the driver's stepping force is not applied to the brake pedal device 2 and the accelerator pedal device 3. In addition, the vehicle body 4 includes a floor 5 and a dash panel 6.

As shown in FIG. 8, where Da is a distance between the driver's seat 7 and the accelerator pedal 90, and Db is a distance between the driver's seat 7 and the brake pedal 40, there is a relationship of Da>Db. That is, the distance Da between the driver's seat 7 and the accelerator pedal 90 is longer than the distance Db between the driver's seat 7 and the brake pedal 40. Thus, the B first housing 10 of the brake pedal device 2 and the A housing 70 of the accelerator pedal device 3 are fixed to the common B second housing 20 for establishing a relationship of Da>Db. Therefore, since the B first housing 10 that swingably supports the brake pedal 40 and the A housing 70 that swingably supports the accelerator pedal 90 are fixed to the common B second housing 20, Da>Db relationship is reliably maintained. That is, Da>Db, which is the relationship between (a) the distance between the driver's seat 7 and the accelerator pedal 90 and (b) the distance between the driver's seat 7 and the brake pedal 40, is reliably maintained.

The pedal module 1 of the first embodiment described above has the following effects.

(1) In the first embodiment, the brake pedal device 2 provided in the pedal module 1 has a configuration, in which the B first housing 10 rotatably supports the B rotating shaft 30, and the B second housing 20 supports an end portion of the B reaction force generation mechanism 60 opposite to the brake pedal 40. Further, the B second housing 20 has a configuration, in which the B second housing 20 extends from the brake pedal device 2 side to the accelerator pedal device 3 side, and fixes the A housing 70 of the accelerator pedal device 3.

According to the above, regarding the brake pedal device 2, two separate parts, i.e., the B first housing 10 that supports the B rotating shaft 30 and the B second housing 20 that supports the B reaction force generation mechanism 60, are respectively made of suitably-selected materials with appropriate strength for the respective parts. Specifically, when the driver applies a stepping force to the brake pedal 40, a high load is input from the brake pedal 40 to the B second housing 20 via the B reaction force generation mechanism 60. Therefore, it is preferable to select a material for the B second housing 20 that has higher rigidity than the B first housing 10. Further, even if a high load is input to the B second housing 20, transmission of the load from the B second housing 20 to the B first housing 10 is cut off, thereby the B first housing 10 is less susceptible to the high load. Therefore, the brake pedal device 2 supports the B rotating shaft 30 by the B first housing 10, thereby enabling stabilization of the swing motion of the brake pedal 40. Therefore, the pedal module 1 can improve the reliability of the output signal of the B sensor 50.

Further, the pedal module 1 is configured such that the A housing 70 is fixed to a portion of the B second housing 20 extending from the brake pedal device 2 side to the accelerator pedal device 3 side. In such manner, the brake pedal 40 and the accelerator pedal 90 are mountable to the vehicle while maintaining the positional relationship between the two. Specifically, the pedal module 1 is mountable to the vehicle while maintaining the positional relationship in which the accelerator pedal 90 is positioned farther away from the occupant than the brake pedal 40. Therefore, the pedal module 1 has an improved mountability of the brake pedal device 2 and the accelerator pedal device 3 to the vehicle, and enhances safety of the vehicle.

(2) In the first embodiment, the brake pedal device 2 is used in the brake-by-wire system 100 in which the master cylinder 126 provided in the brake circuit 120 of the vehicle and the brake pedal 40 are not mechanically connected. Also, the accelerator pedal device 3 is used in the accelerator-by-wire system 200. According to the above, connection points between the pedal module 1 and the vehicle are electrical wiring of the B sensor 50 and electrical wiring of the A sensor 80 and fixing points of the B second housing 20 and the vehicle body 4. Therefore, it is possible to reduce a man-hours required for a design work of the pedal module 1, for each of the vehicle types on which the pedal module 1 is mounted.

(3) In the first embodiment, the A housing 70 is configured to swingably support the accelerator pedal 90, and is screwed to the B second housing 20 with the bolt 24 and the nut 25. According to the above, by screwing the A housing 70 and the B second housing 20 together, a high fastening force is obtainable. Therefore, it is possible to maintain the positional relationship between the brake pedal 40 and the accelerator pedal 90 over time.

(4) In the first embodiment, the A housing 70 and the B first housing 10 are fixed to the common B second housing 20, so that the distance Da between the driver's seat 7 and the accelerator pedal 90 is greater than the distance Db between the driver's seat 7 and the brake pedal 40. According to the above, the relationship between the brake pedal 40 and the accelerator pedal 90 that satisfies Da>Db is reliably maintained. Therefore, even if the driver puts his or her feet on both the brake pedal 40 and the accelerator pedal 90 and steps on them, the force applied to the brake pedal 40 becomes greater, thereby preventing the vehicle from running out of control.

Second Embodiment

The second embodiment will be described with reference to FIG. 9. The second embodiment is different from the first embodiment in a method of attaching a pedal module 1 to the vehicle, and the other parts are similar to the first embodiment, thereby such a difference is mainly explained.

Figure 9:
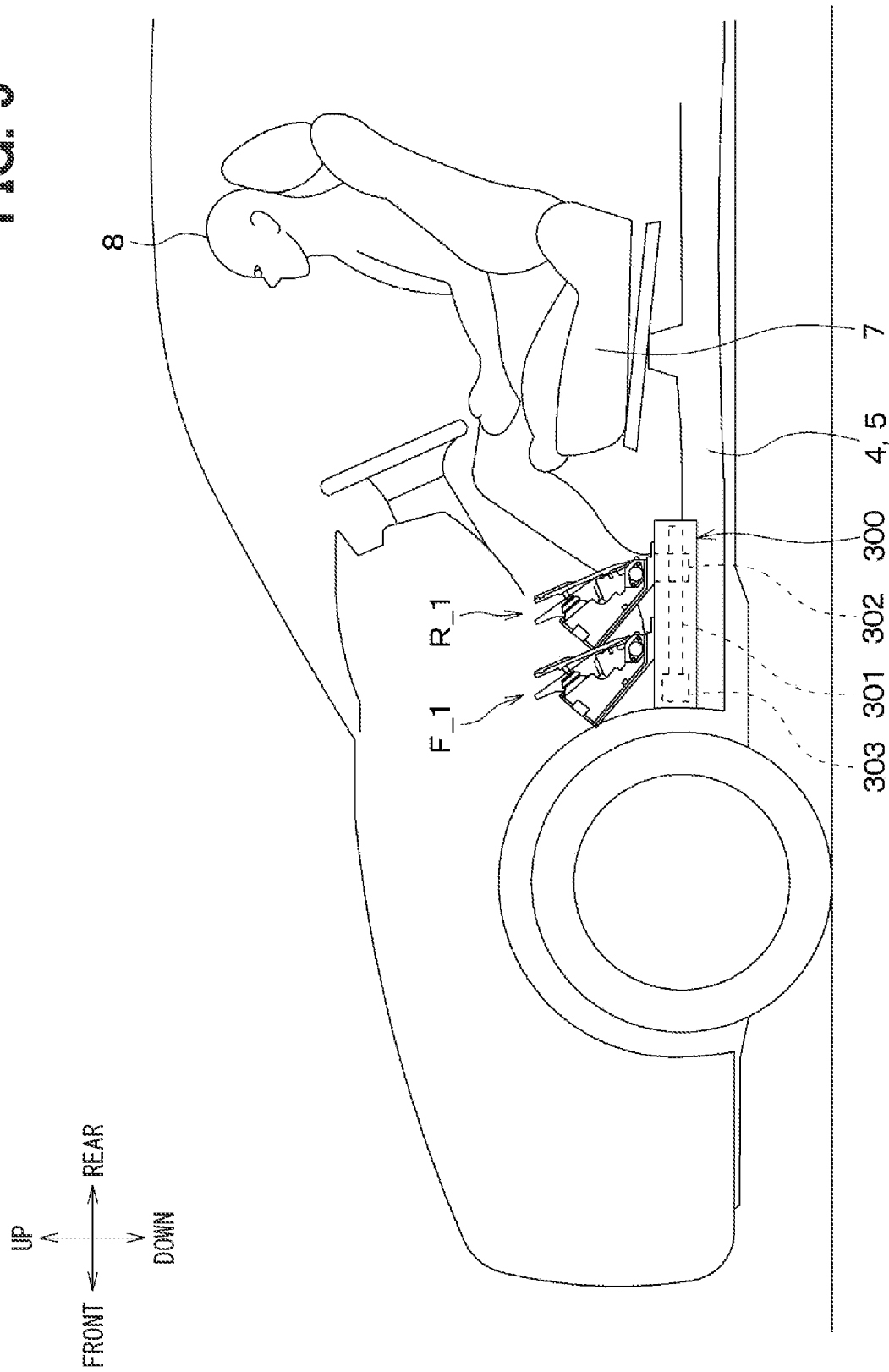
FIG. 9 is a diagram showing a state in which a vehicle pedal module according to a second embodiment is mounted on a vehicle.

As shown in FIG. 9, the pedal module 1 of the second embodiment has a position adjustment mechanism 300 that can adjust a position of the pedal module 1 with respect to a vehicle body 4. The position adjustment mechanism 300 can move the pedal module 1 in the front-rear direction of the vehicle. A ball screw mechanism, for example, can be employed as the position adjustment mechanism 300. In such a case, the ball screw mechanism is made of a ball screw 301, a nut 302, a motor 303, or the like. The ball screw 301 is arranged such that a screw shaft extends in the front-rear direction of the vehicle. The nut 302 is fixed to a lower surface of a B second housing 20 and assembled to the ball screw 301. The motor 303 rotates the ball screw 301 about the screw shaft. With such a configuration, when the motor 303 is driven to rotate the ball screw 301 about the screw shaft, the pedal module 1 moves in the front-rear direction of the vehicle together with the B second housing 20 fixed by the nut 302. Note that F_1 in FIG. 9 shows a state of the pedal module 1 moved forward of the vehicle by the position adjustment mechanism 300, and R_1 in FIG. 9 shows a state of the pedal module 1 moved rearward by the position adjustment mechanism 300. In FIG. 9, the nut 302 is connected to the pedal module 1 at the position R_1, but in reality, the nut 302 moves along with the pedal module 1 in the front-rear direction of the vehicle.

In the second embodiment described above, by adjusting the position of the pedal module 1 according to a physique of a driver 8, the position of a brake pedal 40 and the position of an accelerator pedal 90 are simultaneously adjustable. During such an adjustment, the position adjustment mechanism 300 moves the B second housing 20 to adjust the position of the pedal module 1 while maintaining the positional relationship in which the accelerator pedal 90 is positioned farther away from the driver 8 than the brake pedal 40, thereby enhancing the safety of the vehicle.

Also in the second embodiment, a brake pedal device 2 is used in a brake-by-wire system 100 in which a master cylinder 126 provided in a brake circuit 120 of the vehicle and the brake pedal 40 are not mechanically connected. Also, an accelerator pedal device 3 is used in an accelerator-by-wire system 200. Therefore, since the connection points between the pedal module 1 and the position adjustment mechanism 300 are only members of the electric wiring of a B sensor 50 and an A sensor 80 and the fixed portion between the nut 302 and the B second housing 20, the configuration of the position adjustment mechanism 300 can be simplified.

Third Embodiment

The third embodiment will be described with reference to FIGS. 10 and 11. The third embodiment has a configuration of an accelerator pedal device 3 provided in a pedal module 1 being changed with respect to the first embodiment or the like, with the rest of the configuration similar to the first embodiment. Therefore, only the parts different from the first embodiment or the like will be explained. FIG. 11 referred to in the third embodiment schematically shows a cross section of the pedal module 1 perpendicular to a swing axis CL2 of an accelerator pedal 90.

Figure 10:
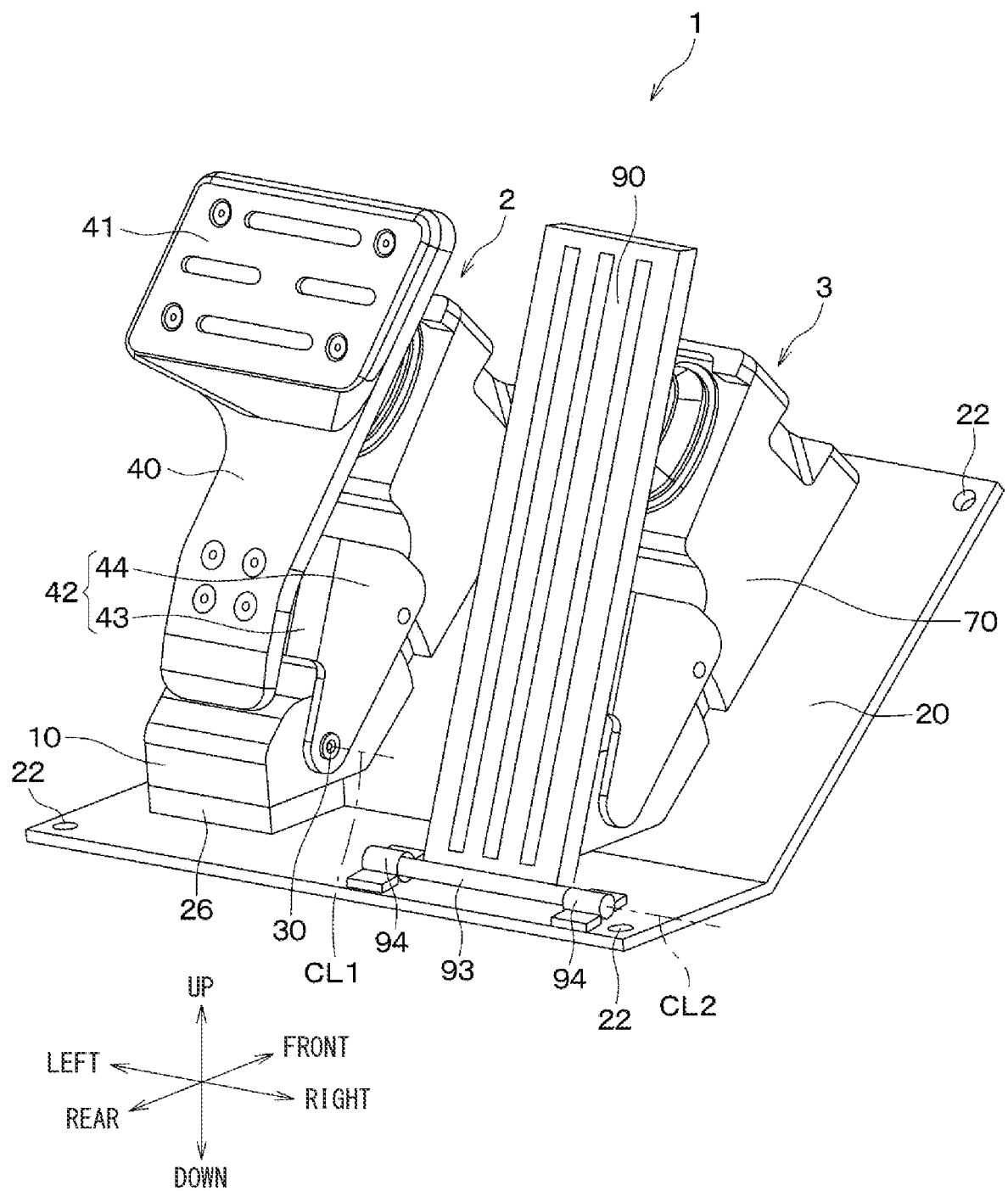
FIG. 10 is a perspective view of a vehicle pedal module according to a third embodiment.
Figure 11:
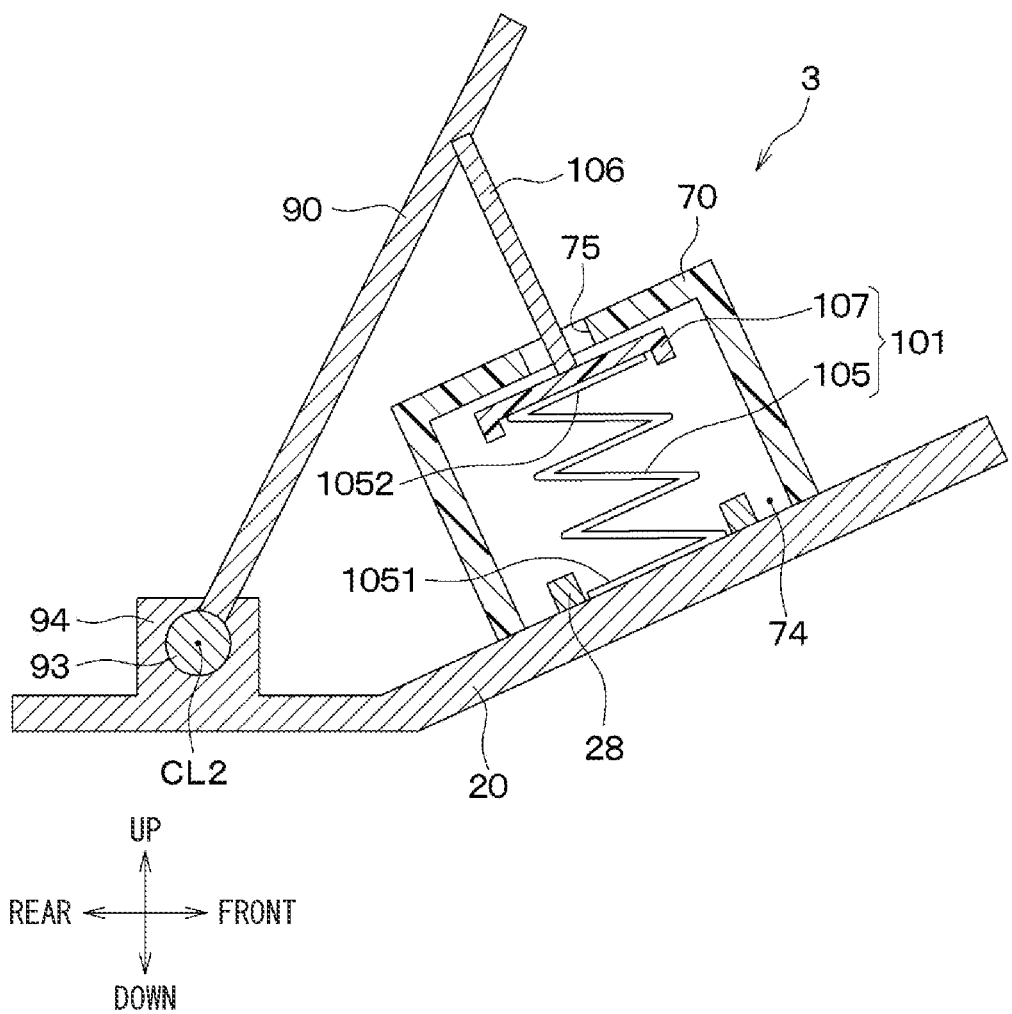
FIG. 11 is a schematic diagram showing a cross section perpendicular to a swing axis of an accelerator pedal in an accelerator pedal device provided in the vehicle pedal module according to the third embodiment.

As shown in FIGS. 10 and 11, the accelerator pedal device 3 included in the pedal module 1 of the third embodiment also has an A housing 70, the accelerator pedal 90, an A reaction force generation mechanism 101, an A sensor 80, or the like.

The A housing 70 is a member that covers the A reaction force generation mechanism 101 and is fixed to a B second housing 20. The A housing 70 is box-shaped, and has an opening 74 on one side thereof facing the vehicle body where the pedal module 1 is installed (that is, on a side facing the B second housing 20). A space for arranging the A reaction force generation mechanism 101 or the like is provided inside the A housing 70. In the manufacturing process of the accelerator pedal device 3, it is possible to insert the A reaction force generation mechanism 101 through the opening 74 of the A housing 70. The opening 74 of the A housing 70 is closed by the B second housing 20. Therefore, the A housing 70 of the third embodiment does not have a housing cover 72 described in the first embodiment.

An accelerator pedal rotating shaft 93 is provided at one end of the accelerator pedal 90 on a side of a B second housing 20. In the following description, the accelerator pedal rotating shaft 93 will be referred to as the A rotating shaft 93. The A rotating shaft 93 is rotatably supported by a bearing member 94 provided in the B second housing 20. Therefore, the accelerator pedal 90 swings about the axis CL2 of the A rotating shaft 93 within a predetermined angular range in the forward and reverse rotation directions. In the third embodiment, the bearing member 94 is provided in the B second housing 20 at a position on the rear side of the vehicle relative to the A housing 70. Therefore, the A rotating shaft 93 is arranged at a position closer to a driver's heel than the A housing 70. Note that the B second housing 20 and the bearing member 94 may be configured as separate parts, or the B second housing 20 and the bearing member 94 may be configured integrally to have one body.

The A reaction force generation mechanism 101 has a coil spring 105 as an elastic member and an upper holder 107. Movement of one end 1051 of the coil spring 105 in the spring axial direction is restricted by a spring receiving portion 28 provided on a side of the B second housing 20. The upper holder 107 is provided at an other end 1052 of the coil spring 105 in the spring axial direction. In the third embodiment, the one end 1051 of the coil spring 105 in the spring axial direction (that is, the one end 1051 of the coil spring 105 on a side of the B second housing 20) corresponds to an end portion of the A reaction force generation mechanism 101 opposite to the accelerator pedal 90.

The accelerator pedal 90 and the upper holder 107 are connected by a connecting member 106. The connecting member 106 has an end on an accelerator pedal 90 side fixed to the accelerator pedal 90 and an end on an upper holder 107 side slidably contacts the upper holder 107. Note that the connecting member 106 may be configured such that the end on the accelerator pedal 90 side thereof is connected to the accelerator pedal 90 in a swingable manner, and the end on the upper holder 107 side thereof is connected to the upper holder 107 in a swingable manner. The connecting member 106 is inserted through an upper opening 75 provided in the A housing 70.

When a driver applies a stepping force to the accelerator pedal 90 and the accelerator pedal 90 swings toward the A housing 70 and the B second housing 20, a load is applied from the accelerator pedal 90 to the coil spring 105 via the connecting member 106. At this time, the coil spring 105 as an elastic member constituting the A reaction force generation mechanism 101 bends in the spring axial direction, and generates a reaction force against the stepping force applied to the accelerator pedal 90 by the driver.

Although not shown in the drawing, the A sensor 80 may be provided on or around the axis CL2 of the A rotating shaft 93 or may be provided inside the A housing 70. When the A sensor 80 is provided on or around the axis CL2 of the A rotating shaft 93, the A sensor 80 detects a rotation angle of the A rotating shaft 93. When the A sensor 80 is provided inside the A housing 70, the A sensor 80 detects an amount of movement of a member such as the upper holder 107 that moves together with the accelerator pedal 90. There is a correlation between the amount of movement of a member such as the upper holder 107 that moves together with the accelerator pedal 90 and the swing angle of the accelerator pedal 90 (that is, the accelerator pedal stroke amount). The A sensor 80 outputs a signal corresponding to the rotation angle of the A rotating shaft 93 or the amount of movement of the upper holder 107 or the like to an accelerator ECU 210 of the vehicle. The accelerator ECU 210 increases or decreases a valve opening degree of an electronic throttle valve 220 based on the accelerator pedal stroke amount.

In the third embodiment described above, the A housing 70 has the opening 74 on one side facing the vehicle body where the pedal module 1 is installed (that is, on the side facing the B second housing 20). The B second housing 20 closes the opening 74 provided on the vehicle body side of the A housing 70, and supports the end of the A reaction force generation mechanism 101 opposite to the accelerator pedal 90. According to the above, when the accelerator pedal device 3 is mounted, the A reaction force generation mechanism 101 attached to the B second housing 20 can be inserted inside the A housing 70 through the opening 74 of the A housing 70. Therefore, in the accelerator pedal device 3 of the third embodiment, the housing cover 72 explained in the first embodiment can be eliminated, so the number of parts is reducible.

Further, in the accelerator pedal device 3 provided in the pedal module 1 of the third embodiment, the A rotating shaft 93 having the swing axis CL2 of the accelerator pedal 90 is provided on the B second housing 20, at a position on the rear side of the vehicle relative to the A housing 70. According to the above, since the A rotating shaft 93 is arranged at a position closer to the driver's heel than the A housing 70, the operability of the accelerator pedal 90 is improved.

Fourth Embodiment

The fourth embodiment will be described with reference to FIGS. 12 and 13. The fourth embodiment has a configuration, which is also changed from the first embodiment or the like, with regard to an accelerator pedal device 3 provided in a pedal module 1, with the rest left unchanged therefrom. Thus, the parts different therefrom will be mainly explained. Note that FIG. 12 shows a state in which the driver's stepping force is not applied to an accelerator pedal 90, and FIG. 13 shows a state in which the driver's stepping force is applied to the accelerator pedal 90.

Figure 12:
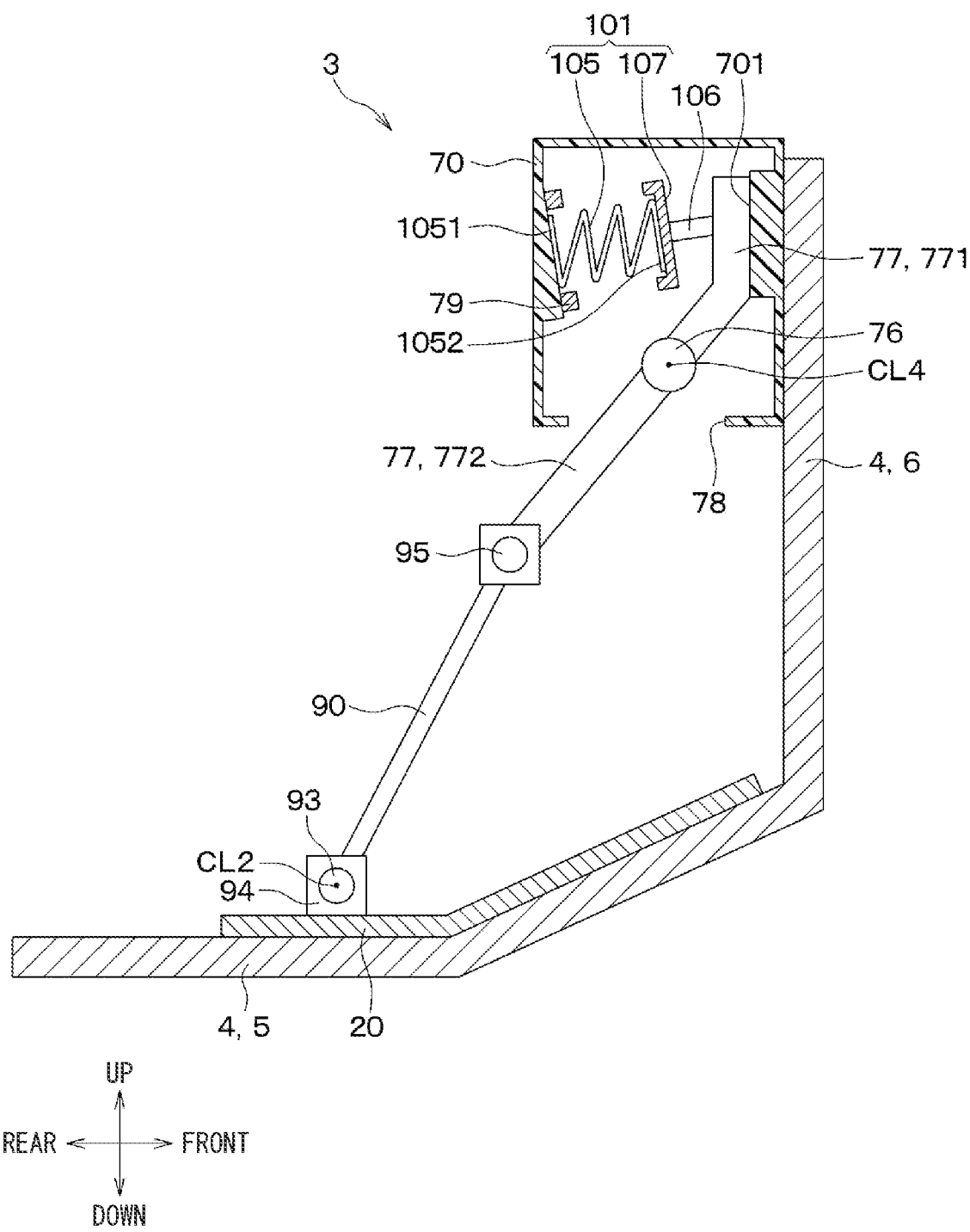
FIG. 12 is a schematic diagram perpendicular to a swing axis of an accelerator pedal in an accelerator pedal device provided in a vehicle pedal module according to a fourth embodiment.
Figure 13:
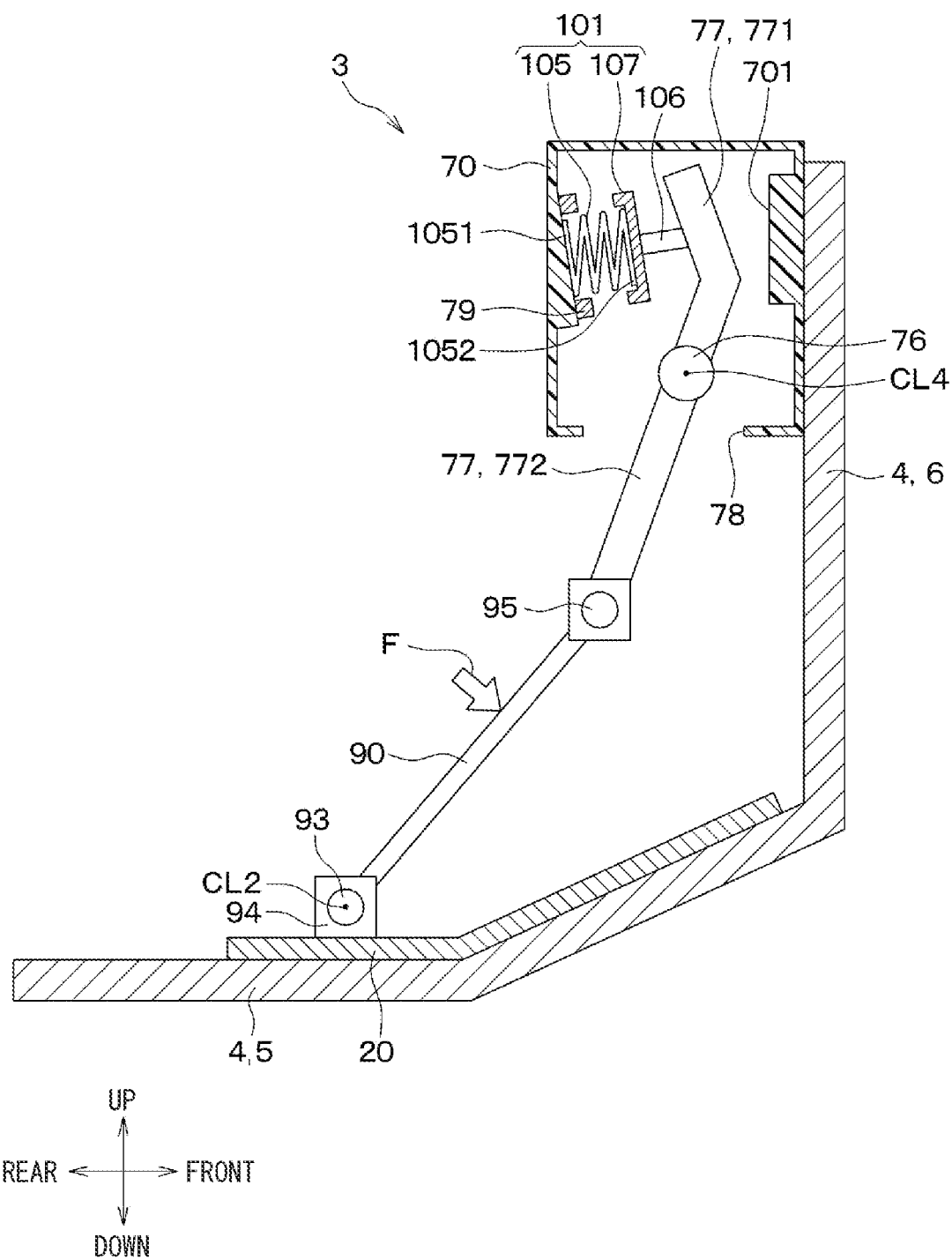
FIG. 13 is a diagram showing a state in which a driver's stepping force is applied to the accelerator pedal in the accelerator pedal device shown in FIG. 12.

As shown in FIGS. 12 and 13, the accelerator pedal device 3 provided in the pedal module 1 of the fourth embodiment includes an A housing 70, a fixed shaft 76, an arm 77, an A reaction force generation mechanism 101, the accelerator pedal 90, an A rotating shaft 93, an A sensor 80, or the like.

The A housing 70 is fixed to a dash panel 6 of the vehicle. The dash panel 6 is a partition wall that separates the interior of the vehicle from the exterior such as an engine room of the vehicle, and is sometimes called a bulkhead. The A housing 70 is box-shaped, and has an opening 78 on a side of a floor 5 of the vehicle.

The A reaction force generation mechanism 101 is provided inside the A housing 70. The A reaction force generation mechanism 101 has a coil spring 105 as an elastic member and an upper holder 107. One end 1051 of the coil spring 105 in the spring axial direction is restricted in movement by a spring receiving portion 79 provided on an inner wall of the A housing 70. The upper holder 107 is provided at the other end 1052 of the coil spring 105 in the spring axial direction.

The fixed shaft 76 is provided inside the A housing 70. The arm 77 is swingably supported on the fixed shaft 76. A portion 771 of the arm 77 that extends inside the A housing 70 from the fixed shaft 76 and the upper holder 107 are connected by a connecting member 106. The connecting member 106 has one end swingably connected to the arm 77 and the other end swingably connected to the upper holder 107. In such manner, the arm 77 is biased by the A reaction force generation mechanism 101 at the portion 771 extending inside the A housing 70 from the fixed shaft 76. On the other hand, a movable link 95 for connecting with the accelerator pedal 90 is provided at one end of a portion 772 of the arm 77 that extends outside the A housing 70 from the fixed shaft 76.

The A rotating shaft 93 is provided at one end of the accelerator pedal 90 on a side of the B second housing 20. The A rotating shaft 93 is provided at a swing axis CL2 of the accelerator pedal 90. The A rotating shaft 93 is rotatably supported by a bearing member 94 provided in the B second housing 20. Therefore, the accelerator pedal 90 swings about the axis CL2 of A rotating shaft 93 within a predetermined angular range in the forward and reverse rotation directions. Note that the B second housing 20 and the bearing member 94 may be configured as separate parts, or the B second housing 20 and the bearing member 94 may be configured integrally to have one body. The B second housing 20 is fixed to the floor 5 of the vehicle.

The end of the accelerator pedal 90 opposite to the A rotating shaft 93 and the end of the portion 772 of the arm 77 extending outside the A housing 70 from the fixed shaft 76 are relatively rotatably connected by the movable link 95.

Although not shown in the drawing, the A sensor 80 may be provided on or around the axis CL2 of the A rotating shaft 93 or may be provided inside the A housing 70. The above configuration is the similar to the one explained in the third embodiment.

As indicated by an arrow F in FIG. 13, when a stepping force of the driver is applied to the accelerator pedal 90, the accelerator pedal 90 swings about the axis CL2 of the A rotating shaft 93, and a portion thereof above the axis CL2 in the vehicle moves toward the floor 5 or the dash panel 6. During such time, as the accelerator pedal 90 swings, the arm 77 connected to the accelerator pedal 90 via the movable link 95 swings about a center of the fixed shaft 76 which is an axis CL4. In such manner, a load is applied to the coil spring 105 of the A reaction force generation mechanism 101 via the connecting member 106 from the portion 771 of the arm 77 that extends further inside the A housing 70 than the fixed shaft 76. The coil spring 105 bends in the spring axial direction, and generates a reaction force against the stepping force applied to the accelerator pedal 90 by the driver.

On the other hand, as shown in FIG. 12, when the driver's stepping force is no longer applied to the accelerator pedal 90, an elastic force of the coil spring 105 causes the portion 771 of the arm 77 extending from the fixed shaft 76 toward the inside of the A housing 70 and a stopper 701 in the A housing 70 to abut to each other. In such manner, the accelerator pedal 90 connected to the arm 77 via the movable link 95 is returned to its initial position.

In the fourth embodiment described above, the B second housing 20 does not support the A housing 70, but the A rotating shaft 93 is rotatably supported by the bearing member 94, thereby a physique of the B second housing 20 can be made smaller. Further, by configuring the B second housing 20 to rotatably support the A rotating shaft 93 with the bearing member 94, a brake pedal 40 and the accelerator pedal 90 are mountable to the vehicle while maintaining the positional relationship therebetween.

Other Embodiments (1) In each of the above-described embodiments, the brake pedal device 2 and the accelerator pedal device 3 included in the pedal module 1 are described as an organ-type pedal device. Not limited to the above, a brake pedal device 2 may be of a pendant type, and an accelerator pedal device 3 may also be of a pendant type.

(2) In each of the above embodiments, as an example of the brake pedal device 2 used in the brake-by-wire system 100, a configuration is explained as the one in which the brake pedal 40 and the master cylinder 126 are not mechanically connected. A brake pedal device 2 is not limited to the above, and a brake pedal 40 and a master cylinder 126 may be mechanically connected.

(3) In each of the above-described embodiments, as an example of the B reaction force generation mechanism 60, a configuration having the leaf spring 61 and the plurality of coil springs 62 and 63 has been described, and, as an example of the A reaction force generation mechanism 101, a configuration having one coil spring 105 has been described. Not limited to the above, a B reaction force generation mechanism 60 and an A reaction force generation mechanism 101 may have, for example, one or more coil springs, or one or more leaf springs. Alternatively, a brake pedal device 2 may be configured such that a brake pedal 40 and a master cylinder 126 are mechanically connected, and the master cylinder 126 generates a reaction force against the stepping force applied to the brake pedal 40 by the driver.

(4) In the above embodiments, the brake-by-wire system 100 uses the master cylinder 126 to generate hydraulic pressure in the brake fluid flowing through the brake circuit 120. Instead, a brake-by-wire system 100 may be configured to generate hydraulic pressure in the brake fluid flowing through a brake circuit 120 using a hydraulic pump, for example.

(5) In each of the above embodiments, a configuration in which the accelerator-by-wire system 200 drives and controls the electronic throttle valve 220 has been described. Instead, an accelerator-by-wire system 200 may be configured to drive and control a motor for driving the vehicle, for example.

(6) In each of the above embodiments, the brake ECU 110 and the accelerator ECU 210 are configured separately. Not limited to the above, a brake ECU 110 and an accelerator ECU 210 may be provided as one ECU, or may be provided as three or more ECUs.

The present disclosure is not limited to the above-described embodiments, and can be appropriately modified. The above-described embodiments are not independent of each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, or the like of the constituent elements of the embodiment are referred to, except in (i) a case where the numerical values are expressly indispensable in particular, (ii) a case where the numerical values are obviously limited to a specific number in principle, or the like, the present disclosure is not limited to such a specific number. Furthermore, a shape, positional relationship or the like of an element, which is referred to in the embodiments described above, is not limited to such a shape, positional relationship or the like, unless it is specifically described or obviously necessary to be limited in principle.

What is claimed is:

1. A pedal module for a vehicle, integrally provided with a plurality of by-wire pedal devices, the pedal module comprising:
    a brake pedal device including
        a brake pedal configured to be stepped on by a foot of a driver and to swing about a first swing axis,
        a brake pedal rotating shaft provided at the first swing axis of the brake pedal,
        a brake pedal sensor configured to output a signal corresponding to a swing angle of the brake pedal,
        a brake-pedal reaction force generation mechanism configured to generate a reaction force against a stepping force of the driver applied to the brake pedal,
        a brake pedal first housing configured to rotatably support the brake pedal rotating shaft and to cover the brake-pedal reaction force generation mechanism, and
        a brake pedal second housing configured to support an end portion of the brake-pedal reaction force generation mechanism, opposite to the brake pedal, and provided at a position between the brake pedal first housing and a vehicle body; and
    an accelerator pedal device including
        an accelerator pedal configured to be stepped on and operated by the foot of the driver to swing about a second swing axis,
        an accelerator pedal sensor configured to output a signal corresponding to the swing angle of the accelerator pedal,
        an accelerator-pedal reaction force generation mechanism configured to generate a reaction force against the stepping force of the driver applied to the accelerator pedal, and
        an accelerator pedal housing configured to cover the accelerator-pedal reaction force generation mechanism, wherein
    the brake pedal second housing is installed on the vehicle body to extend from the brake pedal device to the accelerator pedal device and to fix at least a part of the accelerator pedal device thereto, and
    the brake pedal second housing is made of a material having a Young's modulus larger than that of the brake pedal first housing.

2. The pedal module according to claim 1, wherein
the brake pedal device is configured to use a brake-by-wire system in which an electronic brake control device drives and controls a brake circuit of a hydraulic pressure required for braking the vehicle based on an output signal of the brake pedal sensor without having a mechanical connection between a master cylinder of the brake circuit of the vehicle and the brake pedal, and
the accelerator pedal device is configured to use an accelerator-by-wire system in which an electronic throttle valve or a motor for driving the vehicle is driven and controlled by an electronic accelerator control device based on an output signal of the accelerator pedal sensor.

3. The pedal module according to claim 1, further comprising:
    a position adjustment mechanism configured to adjust a position of the brake pedal second housing with respect to the vehicle body.

4. The pedal module according to claim 1, wherein
the accelerator pedal housing is provided with a support member swingably supporting the accelerator pedal, and
the support member and the brake pedal first housing in the accelerator pedal device are fixed to the brake pedal second housing, such that a distance between a driver's seat of the vehicle and the accelerator pedal is greater than a distance between the driver's seat and the brake pedal.

5. The pedal module according to claim 1, wherein
the accelerator pedal housing is configured to swingably support the accelerator pedal, and is fixed to the brake pedal second housing with a screw.

6. The pedal module according to claim 1, further comprising:
    an accelerator pedal rotating shaft provided at the second swing axis of the accelerator pedal, wherein
    the accelerator pedal rotating shaft is provided in the brake pedal second housing at a position on a rear side of the vehicle relative to the accelerator pedal housing.

7. The pedal module according to claim 1, wherein
the brake pedal second housing is configured to close an opening provided on a vehicle body side of the accelerator pedal housing, and to support one end of the accelerator-pedal reaction force generation mechanism opposite to the accelerator pedal.

8. The pedal module according to claim 1, further comprising:
    a fixed shaft provided in the accelerator pedal housing;
    an arm (i) configured to be swingably supported by the fixed shaft and (ii) having an extension portion extending inside the accelerator pedal housing from the fixed shaft and biased by the accelerator-pedal reaction force generation mechanism;
    an accelerator pedal rotating shaft provided at the second swing axis of the accelerator pedal; and
    a movable link connecting an end of an extension portion of the arm extending from the fixed shaft to an outside of the accelerator pedal housing, and an end of the accelerator pedal opposite to the accelerator pedal rotating shaft, to be relatively rotatable, wherein
    the brake pedal second housing rotatably supports the accelerator pedal rotating shaft without supporting the accelerator pedal housing.

9. The pedal module according to claim 1, wherein
the brake pedal first housing has an opening into which the brake-pedal reaction force generation mechanism is inserted, and
the opening of the brake pedal first housing is closed by the brake pedal second housing.

10. The pedal module according to claim 1, wherein
the brake-pedal reaction force generation mechanism includes a leaf spring;
the brake pedal second housing includes a first planar portion and a second planar portion, the second planar portion extending at an angle with respect to the first planar portion;

the brake pedal second housing further includes a support base projecting from the first planar portion; and
an end of the leaf spring is fastened to the support base.

11. The pedal module according to claim 10, wherein the end of the leaf spring is fastened to the support base using a bolt.

12. The pedal module according to claim 1, wherein
the brake pedal second housing includes a first planar portion and a second planar portion, the second planar portion extending at an angle with respect to the first planar portion;
the brake pedal second housing includes a support base projecting from the first planar portion;
a portion of the brake-pedal reaction force generation mechanism is supported by the support base; and
the accelerator pedal housing is fastened to the second planar portion of the brake pedal second housing.

13. The pedal module according to claim 1, wherein
the brake pedal second housing includes a first planar portion and a second planar portion, the second planar portion extending at an angle with respect to the first planar portion;
the brake pedal second housing includes a support base projecting from the first planar portion, and the support base is configured to support a portion of the brake-pedal reaction force generation mechanism;
an accelerator pedal rotating shaft is provided at the second swing axis of the accelerator pedal; and
the accelerator pedal rotating shaft is provided in the first planar portion of the brake pedal second housing.

* * * * *